United States Patent
Nam et al.

(10) Patent No.: US 10,342,400 B2
(45) Date of Patent: Jul. 9, 2019

(54) AUTONOMOUS CLEANER

(71) Applicant: LG ELECTRONICS INC., Seoul (KR)

(72) Inventors: Bohyun Nam, Seoul (KR); Inbo Shim, Seoul (KR); Jihoon Sung, Seoul (KR); Sojin Park, Seoul (KR); Seunghyun Song, Seoul (KR); Sangkyu Lee, Seoul (KR); Woochan Jun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/599,780

(22) Filed: May 19, 2017

(65) Prior Publication Data
US 2017/0332853 A1    Nov. 23, 2017

(30) Foreign Application Priority Data

May 20, 2016 (KR) .................. 10-2016-0062415
Jun. 10, 2016 (KR) .................. 10-2016-0072690
(Continued)

(51) Int. Cl.
*A47L 5/30* (2006.01)
*A47L 9/00* (2006.01)
(Continued)

(52) U.S. Cl.
CPC .................. *A47L 5/30* (2013.01); *A47L 9/00* (2013.01); *A47L 9/009* (2013.01); *A47L 9/0411* (2013.01);
(Continued)

(58) Field of Classification Search
CPC .... A47L 9/1608; A47L 9/1426; A47L 9/1857; A47L 9/1683; A47L 9/1691; A47L 9/16;
(Continued)

(56) References Cited

U.S. PATENT DOCUMENTS 2,308,382 A    1/1943  McDermott
4,596,412 A    6/1986  Everett et al.
(Continued)

FOREIGN PATENT DOCUMENTS

CA    2 946 142    10/2015
CN    101744579    8/2012
(Continued)

OTHER PUBLICATIONS

JP-2007097984-A Translation, Espacenet (Year: 2018).*
(Continued)

*Primary Examiner* — Joseph J Hail
*Assistant Examiner* — Timothy Brian Brady
(74) *Attorney, Agent, or Firm* — Ked & Associates, LLP

(57) ABSTRACT

A autonomous cleaner includes: a cleaner body including a wheel unit for autonomous traveling; a suction unit provided to protrude from one side of the cleaner body, the suction unit sucking air containing dust; a sensing unit provided at the one side of the cleaner body; a dust container accommodated in a dust container accommodation part formed at the other side of the cleaner body, the dust container collecting dust filtered from sucked air; and a dust container cover hinge-coupled to the cleaner body to be rotatable, the dust container cover being provided to cover a top surface of the dust container when the dust container cover is coupled to the dust container.

18 Claims, 24 Drawing Sheets

(30) Foreign Application Priority Data

Aug. 26, 2016 (KR) ........................ 10-2016-0109303
Oct. 27, 2016 (KR) ........................ 10-2016-0141106

(51) Int. Cl.

| | | |
|---|---|---|
| A47L 9/02 | (2006.01) | |
| A47L 9/04 | (2006.01) | |
| A47L 9/10 | (2006.01) | |
| A47L 9/12 | (2006.01) | |
| A47L 9/14 | (2006.01) | |
| A47L 9/16 | (2006.01) | |
| A47L 9/28 | (2006.01) | |

(52) U.S. Cl.

CPC ............... *A47L 9/106* (2013.01); *A47L 9/122* (2013.01); *A47L 9/1427* (2013.01); *A47L 9/1608* (2013.01); *A47L 9/1683* (2013.01); *A47L 9/1691* (2013.01); *A47L 9/2857* (2013.01); *A47L 9/2884* (2013.01); *A47L 9/02* (2013.01); *A47L 9/04* (2013.01); *A47L 9/10* (2013.01); *A47L 9/12* (2013.01); *A47L 9/1409* (2013.01); *A47L 9/16* (2013.01); *A47L 9/28* (2013.01); *A47L 9/2868* (2013.01); *A47L 2201/00* (2013.01); *A47L 2201/04* (2013.01); *A47L 2201/06* (2013.01); *H01M 2220/30* (2013.01)

(58) Field of Classification Search

CPC .......... A47L 9/106; A47L 9/10; A47L 9/1409; A47L 2201/00; A47L 2201/024; A47L 11/33; A47L 11/4025; Y10T 403/59; Y10T 403/591; Y10T 403/599; Y10T 403/60; Y10T 403/604; Y10T 292/08; Y10T 292/0801; Y10T 292/0807; Y10T 292/0834; Y10T 292/0836; Y10T 292/0838; Y10T 292/0845; Y10T 292/0846; Y10T 292/096; Y10T 292/0976; Y10T 292/0999; Y10T 292/1001; Y10T 292/1014; Y10T 292/1022; Y10T 292/1028; F16B 2/04; F16B 7/042; Y10S 292/11; Y10S 292/63; E05C 1/00; E05C 1/1004; E05C 1/02; E05C 1/04; E05C 1/06; E05C 19/04; E05C 19/045; E05C 19/10

USPC ....... 15/319, 347, 352, 353; 403/321, 322.1, 403/325, 326, 328

See application file for complete search history.

(56) References Cited

U.S. PATENT DOCUMENTS

| | | | |
|---|---|---|---|
| 4,954,962 | A | 9/1990 | Evans, Jr. et al. |
| 4,996,468 | A | 2/1991 | Field et al. |
| 5,233,914 | A | 8/1993 | English |
| 6,286,972 | B1 | 9/2001 | Shepherd et al. |
| 6,829,805 | B2 | 12/2004 | Yang |
| 6,836,931 | B2 | 1/2005 | Bone |
| 8,689,401 | B2 | 4/2014 | Makarov et al. |
| 8,776,311 | B2 | 7/2014 | Genn et al. |
| 8,874,268 | B2 | 10/2014 | Kim et al. |
| 9,265,396 | B1 | 2/2016 | Lu et al. |
| 9,427,123 | B2 | 8/2016 | Vanderstegen-Drake et al. |
| 9,511,494 | B2 | 12/2016 | Noh et al. |
| 9,930,429 | B2 | 3/2018 | Kekäläinen |
| 2004/0250374 | A1 | 12/2004 | Park et al. |
| 2006/0230726 | A1 | 10/2006 | Oh et al. |
| 2006/0254226 | A1 | 11/2006 | Jeon |
| 2007/0113373 | A1 | 5/2007 | Hato et al. |
| 2008/0115315 | A1 | 5/2008 | White et al. |
| 2008/0281470 | A1 | 11/2008 | Gilbert, Jr. et al. |
| 2010/0132319 | A1 | 6/2010 | Ashbee et al. |
| 2010/0235000 | A1 | 9/2010 | Hsu |
| 2011/0278082 | A1 | 11/2011 | Chung et al. |
| 2012/0095597 | A1 | 4/2012 | Kim et al. |
| 2012/0180249 | A1 | 7/2012 | Tso et al. |
| 2013/0061417 | A1 | 3/2013 | Vanderstegen-Drake et al. |
| 2013/0061420 | A1 | 3/2013 | Vanderstegen-Drake et al. |
| 2013/0204483 | A1 | 8/2013 | Sung et al. |
| 2013/0305483 | A1* | 11/2013 | Dyson .................... A47L 9/122 15/353 |
| 2013/0305484 | A1 | 11/2013 | Dyson et al. |
| 2013/0338831 | A1 | 12/2013 | Noh et al. |
| 2014/0182627 | A1 | 7/2014 | Williams et al. |
| 2015/0108244 | A1 | 4/2015 | Pruiett et al. |
| 2015/0115876 | A1 | 4/2015 | Noh et al. |
| 2015/0168954 | A1 | 6/2015 | Hickerson et al. |
| 2015/0185322 | A1 | 7/2015 | Haegermarck |
| 2015/0245754 | A1 | 9/2015 | Jang et al. |
| 2016/0058261 | A1 | 3/2016 | Dyson et al. |
| 2016/0095487 | A1 | 4/2016 | Koura et al. |
| 2016/0100733 | A1 | 4/2016 | Kim et al. |
| 2016/0274579 | A1 | 9/2016 | So et al. |
| 2016/0274580 | A1 | 9/2016 | Jung et al. |
| 2016/0302637 | A1 | 10/2016 | Wennerström |
| 2016/0302639 | A1 | 10/2016 | Lindhé et al. |
| 2017/0055797 | A1 | 3/2017 | Kim et al. |
| 2017/0156560 | A1 | 6/2017 | Jung et al. |
| 2017/0231447 | A1 | 8/2017 | Izawa et al. |
| 2017/0273531 | A1 | 9/2017 | Watanabe et al. |
| 2017/0319033 | A1 | 11/2017 | Hyun et al. |
| 2017/0332864 | A1 | 11/2017 | Nam et al. |
| 2017/0344019 | A1 | 11/2017 | Haegermarck et al. |
| 2018/0255997 | A1 | 9/2018 | So et al. |

FOREIGN PATENT DOCUMENTS

| | | |
|---|---|---|
| CN | 102987989 | 3/2013 |
| CN | 103417162 | 12/2013 |
| CN | 104597902 | 5/2015 |
| DE | 10 2005 024 750 | 9/2006 |
| EP | 1 237 459 | 6/2004 |
| EP | 2 882 328 | 6/2016 |
| FR | 2 940 902 | 7/2010 |
| JP | 07-049381 | 2/1995 |
| JP | 2002-360480 | 12/2002 |
| JP | 2003-323214 | 11/2003 |
| JP | 2003-336553 | 11/2003 |
| JP | 2004-254970 | 9/2004 |
| JP | 2006-155274 | 6/2006 |
| JP | 2007-097984 | 4/2007 |
| JP | 2007097984 A * | 4/2007 |
| JP | 2007-282710 | 11/2007 |
| JP | 2008-067930 | 3/2008 |
| JP | 2009-504310 | 2/2009 |
| JP | 4996976 | 8/2012 |
| JP | 2013-144029 | 7/2013 |
| JP | 2014-048842 | 3/2014 |
| JP | 2016-047221 | 4/2016 |
| JP | 2016-049127 | 4/2016 |
| JP | 2016-052506 | 4/2016 |
| JP | 5928656 | 6/2016 |
| KR | 20-2000-0008646 | 5/2000 |
| KR | 10-2004-0003444 | 1/2004 |
| KR | 10-0500829 | 7/2005 |
| KR | 10-2007-0045855 | 5/2007 |
| KR | 10-0767122 | 10/2007 |
| KR | 10-0778125 | 11/2007 |
| KR | 10-0842706 | 7/2008 |
| KR | 10-2009-0063346 | 6/2009 |
| KR | 10-2009-0131098 | 12/2009 |
| KR | 10-2010-0116999 | 11/2010 |
| KR | 10-2011-0026414 | 3/2011 |
| KR | 10-1026065 | 4/2011 |
| KR | 10-2012-0066013 | 6/2012 |
| KR | 10-2013-0027355 | 3/2013 |
| KR | 10-2013-0030932 | 3/2013 |
| KR | 10-1231932 | 3/2013 |
| KR | 10-2013-0097623 | 9/2013 |

(56) References Cited

FOREIGN PATENT DOCUMENTS

| | | |
|---|---|---|
| KR | 10-1330735 | 11/2013 |
| KR | 10-2013-0141979 | 12/2013 |
| KR | 10-1352272 | 1/2014 |
| KR | 10-1362373 | 2/2014 |
| KR | 10-2014-0061490 | 5/2014 |
| KR | 10-1408723 | 7/2014 |
| KR | 10-1411685 * | 7/2014 |
| KR | 10-2014-0096610 | 8/2014 |
| KR | 10-2014-0107991 | 9/2014 |
| KR | 10-2014-0120437 | 10/2014 |
| KR | 10-2015-0008910 | 1/2015 |
| KR | 10-2015-0065972 | 6/2015 |
| KR | 10-2015-0102365 | 9/2015 |
| KR | 10-2016-0048750 | 5/2016 |
| TW | 1388956 | 3/2013 |
| WO | WO 2011/074716 | 6/2011 |
| WO | WO 2013/105431 | 7/2013 |
| WO | WO 2015/060672 | 4/2015 |
| WO | WO 2015/090399 | 6/2015 |

OTHER PUBLICATIONS

KR 10-1411685 Translation, Espacenet (Year: 2018).*
Taiwanese Office Action dated Jun. 20, 2018 issued in Application No. 106116759.
Taiwanese Office Action dated Jun. 21, 2018 issued in Application No. 106116755.
Taiwanese Office Action dated Jun. 21, 2018 issued in Application No. 106116761.
Korean Notice of Allowance dated Jun. 29, 2018 issued in Application No. 10-2016-0184439.
PCT Search Report dated Aug. 25, 2017 issued in Application No. PCT/KR2017/005244.
PCT Search Report dated Aug. 25, 2017 issued in Application No. PCT/KR2017/005245.
PCT Search Report dated Aug. 25, 2017 issued in Application No. PCT/KR2017/005246.
PCT Search Report dated Aug. 25, 2017 issued in Application No. PCT/KR2017/005247.
PCT Search Report dated Aug. 25, 2017 issued in Application No. PCT/KR2017/005249.
PCT Search Report dated Aug. 28, 2017 issued in Application No. PCT/KR2017/005238.
PCT Search Report dated Aug. 28, 2017 issued in Application No. PCT/KR2017/005243.
PCT Search Report dated Aug. 30, 2017 issued in Application No. PCT/KR2017/005239.
PCT Search Report dated Aug. 30, 2017 issued in Application No. PCT/KR2017/005240.
PCT Search Report dated Sep. 4, 2017 issued in Application No. PCT/KR2017/005236.
Korean Office Action dated Sep. 20, 2017 issued in Application No. 10-2016-0109310.
Korean Office Action dated Sep. 20, 2017 issued in Application No. 10-2016-0109317.
European Search Report dated Oct. 2, 2017 issued in Application No. 17000864.3.
Korean Office Action dated Dec. 12, 2017 issued in Application No. 10-2016-0184439.
Korean Notice of Allowance dated Dec. 12, 2017 issued in Application No. 10-2016-0184442.
Korean Office Action dated Dec. 14, 2017 issued in Application No. 10-2016-0184446.
Taiwanese Office Action dated Mar. 9, 2018 issued in Application No. 106116758 (with English translation).
Korean Office Action dated Mar. 20, 2018 issued in Application No. 10-2016-0141106.
Taiwanese Office Action dated Mar. 21, 2018 issued in Application No. 106116753 (with English translation).
United States Office Action dated Feb. 1, 2019 issued in U.S. Appl. No. 15/599,829.
U.S. Ex parte Quayle Action dated Feb. 15, 2019 issued in U.S. Appl. No. 15/599,870.
United States Office Action dated Nov. 20, 2018 issued in U.S. Appl. No. 15/599,863.
United States Office Action dated Dec. 3, 2018 issued in U.S. Appl. No. 15/599,800.
United States Office Action dated Dec. 6, 2018 issued in U.S. Appl. No. 15/599,894.
United States Office Action dated Nov. 9, 2018 issued in U.S. Appl. No. 15/599,783.
United States Office Action dated Nov. 14, 2018 issued in U.S. Appl. No. 15/599,804.
Taiwanese Office Action dated Aug. 20, 2018 issued in Application No. 106116762.
Taiwanese Office Action dated Sep. 19, 2018 issued in Application No. 106116754.
Taiwanese Office Action dated Sep. 20, 2018 issued in Application No. 106116756.
United States Office Action dated Feb. 11, 2019 issued in co-pending related U.S. Appl. No. 15/599,862.
United States Office Action dated Mar. 5, 2019 issued in U.S. Appl. No. 15/599,786.
U.S. Final Office Action dated Mar. 28, 2019 issued in U.S. Appl. No. 15/599,804.
U.S. Final Office Action dated Mar. 15, 2019 issued in U.S. Appl. No. 15/599,783.

* cited by examiner (a)

(b)

(c)

(d)

(e)

AUTONOMOUS CLEANER

CROSS-REFERENCE TO RELATED APPLICATIONS

This application claims priority under 35 U.S.C. § 119 to Korean Application No. 10-2016-0062415, filed in Republic of Korea on May 20, 2016, Korean Application No. 10-2016-0072690, filed in Republic of Korea on Jun. 10, 2016, Korean Application No. 10-2016-0141106, filed in Republic of Korea on Oct. 27, 2016, and Korean Application No. 10-2016-0109303, filed in Republic of Korea on Aug. 26, 2016, whose entire disclosures are hereby incorporated by reference.

BACKGROUND

1. Field

The present disclosure relates to a autonomous cleaner and/or robot cleaner.

2. Background

In general, robots have been developed for industrial purposes to play a role in factory automation. Recently, application fields of robots have extended, and robots for medical purpose, space navigation robots, etc., and even home robots available that may be used in general houses have been developed.

A representative example of home robots is a autonomous cleaner. The autonomous cleaner performs a function of cleaning a floor while traveling by itself in a certain area. For example, a household autonomous cleaner is configured to suck dust (including foreign substances) on a floor or mop the floor while autonomously traveling inside a house.

Such a autonomous cleaner generally includes a rechargeable battery and various sensors for avoiding an obstacle during traveling. Thus, the autonomous cleaner performs a cleaning function while traveling by itself.

In order to allow the autonomous traveling of a autonomous cleaner to be smoothly performed, it is important to set the entire traveling route and sense obstacles on the traveling route. The autonomous cleaner may also perform a function of photographing or monitoring the inside of a house using autonomous traveling characteristics thereof. In order to perform the above-described functions, various sensors are used in the autonomous cleaner, but studies for an optimized design have not been satisfactory yet.

In addition, a typical autonomous cleaner has a structure in which a suction unit is provided at a lower portion of a cleaner body. However, the structure in which the suction unit is built in the cleaner body has problems in that the suction force of the autonomous cleaner is decreased, that the separation of a brush roller is impossible, and the like. Accordingly, there has been proposed a structure in which a suction unit is provided to protrude from a cleaner body as disclosed in the following patent documents. However, the structure has many problems to be solved in that the probability of collision between the suction unit and an obstacle is increased, that the suction unit is located in a blind spot of a sensing unit provided in the cleaner body, and the like.

In a structure in which a dust container is coupled to a cleaner body, and a dust container cover is coupled to the dust container, it is important to accurately assemble the components and easily perform the assembly. However, any product having the structure has not been released yet.

In addition, air introduced into a autonomous cleaner typically passes through a HEPA filter for filtering fine dust before the air is discharged through an exhaust port. In the existing autonomous cleaners, there is an inconvenience that a portion of a cleaner body should be disassembled so as to replace or clean the HEPA filter.

Various autonomous cleaners are described in the following documents:

Patent Document 1: U.S. Patent Laid-Open Publication No. US 2013/0305484 A1 (published on Nov. 21, 2013);

Patent Document 2: U.S. Patent Laid-Open Publication No. US 2013/0061420 A1 (published on Mar. 14, 2013); and Patent Document 3: U.S. Patent Laid-Open Publication No. US 2013/0061417 A1 (published on Mar. 14, 2013).

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Figure 1:
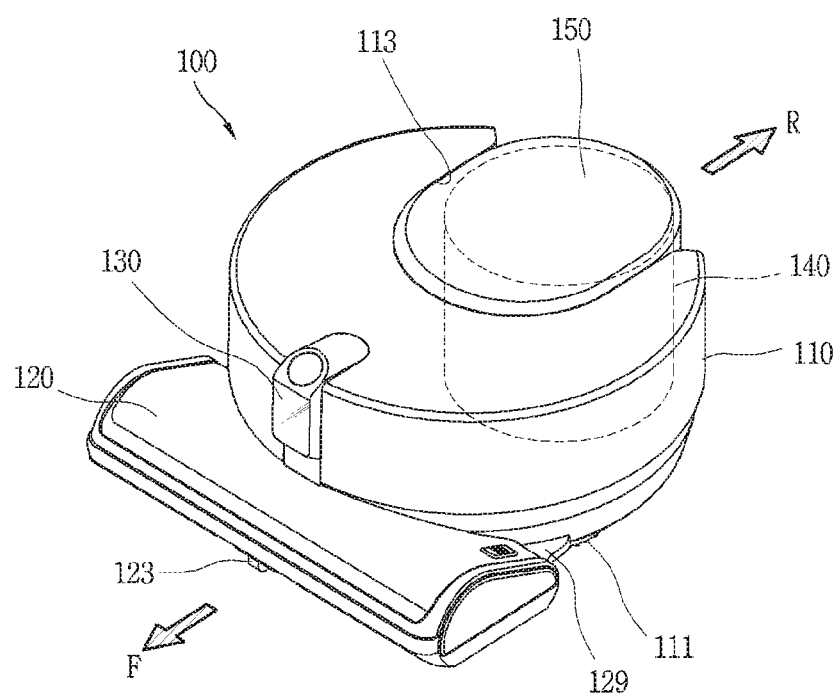
FIG. 1 is a perspective view illustrating an example of a autonomous cleaner according to an embodiment.
Figure 2:
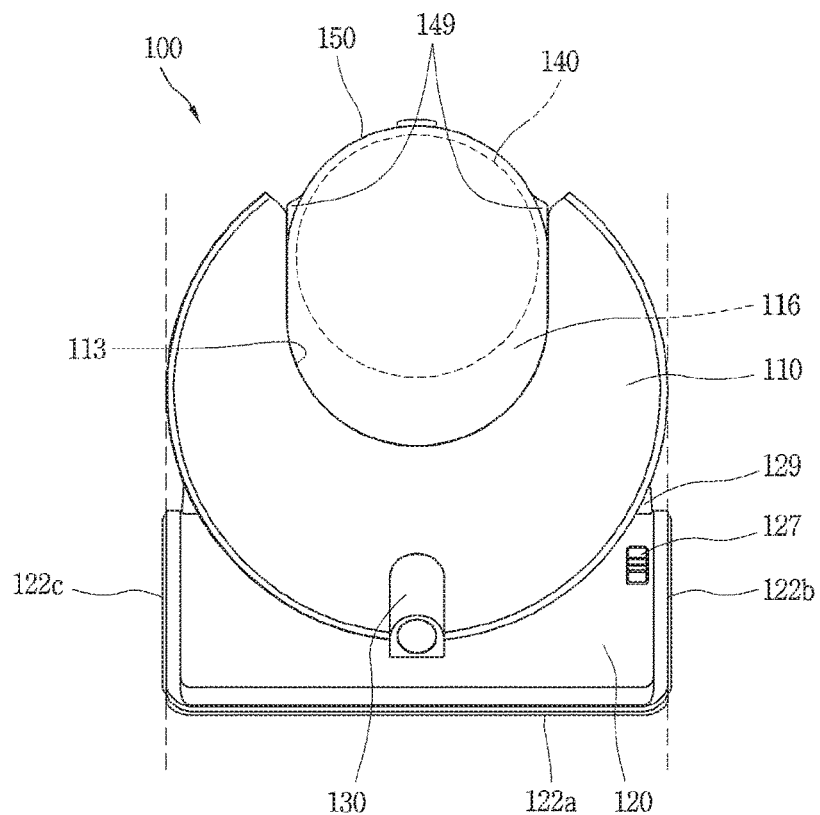
FIG. 2 is a plan view of the autonomous cleaner shown in FIG. 1.
Figure 3:
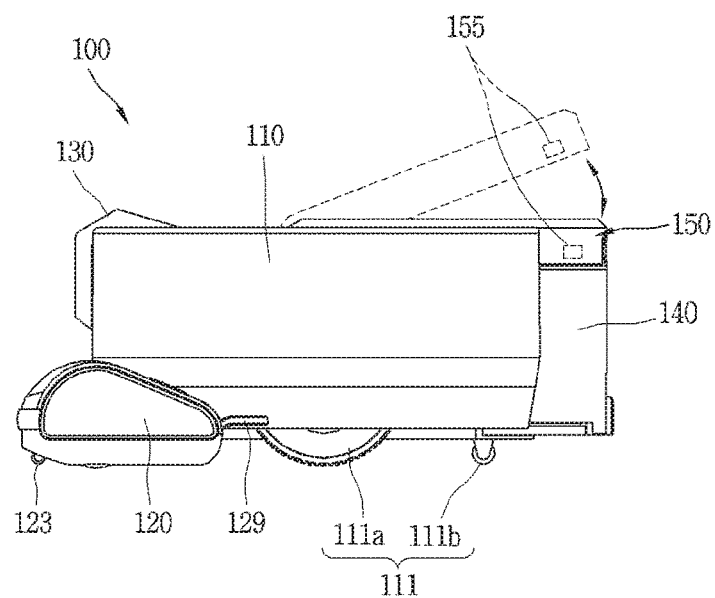
FIG. 3 is a side view of the autonomous cleaner shown in FIG. 1.

Referring to FIGS. 1 to 3, the autonomous cleaner 100 cleans a floor while traveling autonomously in a certain area. The cleaning of the floor includes sucking foreign substances, e.g., debris, dust, fine dust, ultrafine dust, etc., of the floor or mopping the floor. The autonomous cleaner 100 includes a cleaner body 110, a suction unit 120 (e.g. cleaner head), a sensing unit or module 130, and a dust container 140. The cleaner body 110 is provided with a controller for controlling the autonomous cleaner 100 and wheels 111 for allowing the autonomous cleaner 100 to travel. The autonomous cleaner 100 may be moved in all directions or be rotated by the wheels 111.

The wheels 111 includes main wheels 111a and a sub-wheel 111b. The main wheels 111a are provided at both sides of the cleaner body 110 to be rotatable in one direction or the other direction according to a control signal of the controller. The main wheels 111a may be configured to be driven independently from each other. For example, the main wheels 111a may be driven by different driving motors, respectively. The sub-wheel 111b supports the cleaner body 110 together with the main wheels 111a, and is configured to assist traveling of the autonomous cleaner 100 through the main wheels 111a. The sub-wheel 111b may also be provided in the suction unit 120. The controller controls the driving of the wheels 111, such that the autonomous cleaner 100 autonomously travels on the floor.

A battery supplies power to the autonomous cleaner 100 and is mounted in the cleaner body 110. The battery is rechargeable and may be configured to be attachable/detachable to/from a bottom surface of the cleaner body 110.

The suction unit 120 is provided in a shape protruding from one side of the cleaner body 110 to suck air containing foreign substances. The one side may be a side at which the cleaner body 110 travels in a forward direction F, i.e., the front of the cleaner body 110. The suction unit 120 may have a shape protruding frontward, leftward, and rightward at the one side of the cleaner body 110. A front end portion of the suction unit 120 may be provided at a position spaced apart forward from the one side of the cleaner body 110, and both left and right end portions of the suction unit 120 are provided at positions spaced apart leftward and rightward from the one side of the cleaner body 110, respectively.

As the cleaner body 110 is formed in a circular shape, and both sides of a rear end portion of the suction unit 120 are respectively formed to protrude leftward and rightward from the cleaner body 110, empty spaces, i.e., gaps may be formed between the cleaner body 110 and the suction unit 120. The empty spaces are spaces between both left and right end portions of the cleaner body 110 and both left and right end portions of the suction unit 120, and have a shape recessed inward of the autonomous cleaner 100.

When an obstacle is inserted into the empty space, a problem may occur where the autonomous cleaner 100 is caught by the obstacle and may stop movement. In order to prevent this problem, a cover member 129 or a flap of a plate or wedge shape may be provided to cover at least one portion of the empty space. The cover member 129 may be provided to the cleaner body 110 or the suction unit 120. In this embodiment, the cover members 129 may protrude from both sides of the rear end portion of the suction unit 120 to cover outer circumferential surfaces of the cleaner body 110, respectively.

The cover members 129 are provided to fill in the empty space, i.e., at least one portion of the empty spaces between the cleaner body 110 and the suction unit 120. The cover member 129 is provided to fill in at least one portion of spaces recessed inward between left and right outer circumferential surfaces of the cleaner body 110 formed in a curve and both left and right end portions of the suction unit 120 formed to protrude from the respective left and right outer circumferential surfaces. The structure of the cover member 129 may prevent an obstacle from being caught in the empty space or may allow escape from an obstacle even when the obstacle is caught in the empty space.

The cover member 129 formed to protrude from the suction unit 120 may be supported by the outer circumferential surface of the cleaner body 110. When the cover member 129 is formed to protrude from the cleaner body 110, the cover member 129 may be supported by a rear surface portion of the suction unit 120. When the suction unit 120 collides with an obstacle and receives an impact from the obstacle, a portion of the impact is transferred to the cleaner body 110, such that the force of impact may be distributed.

The suction unit 120 may be detachably coupled to the cleaner body 110. The suction unit 120 may be swapped with a mop module. When a user intends to remove dust of a floor, the user may mount the suction unit 120 to the cleaner body 110. When the user intends to mop the floor, the user may mount the mop module to the cleaner body 110.

When the suction unit 120 is mounted to the cleaner body 110, the mounting may be guided by the cover members 129. The cover members 129 are provided to cover the outer circumferential surface of the cleaner body 110 such that a relative position of the suction unit 120 with respect to the cleaner body 110 can be determined and/or aligned.

The sensing unit 130 (sensor module) is provided at the cleaner body 110. The sensing unit 130 may be provided at one side of the cleaner body 110, i.e., the front of the cleaner main body 110. The sensing unit 130 may protrude from top and side surfaces of the cleaner body 110, and an upper end 134b1 (FIG. 5) of the sensing unit 130 is formed at a position protruding upward from the top surface of the cleaner body 110.

The sensing unit 130 may be provided to overlap with the suction unit 120 in the top-bottom direction of the cleaner body 110. The sensing unit 130 is provided above the suction unit 120 to sense an obstacle and/or geographic feature at the front thereof such that the suction unit 120 located foremost of the autonomous cleaner 100 does not collide with the obstacle and/or geographic feature. The sensing unit 130 is configured to additionally perform another sensing function other than a sensing function, which will be described in detail hereinafter.

A dust container accommodation part 113 (recess) is provided in the cleaner body 110, and the dust container 140 that separates and collects foreign substances of the sucked air is detachably coupled to the dust container accommodation part 113. The dust container accommodation part 113 may be formed at the other side of the cleaner body 110, e.g., the rear of the cleaner body 110. The dust container accommodation part 113 has a shape opened rearward and upward from the cleaner body 110. The dust container accommodation part 113 may be formed in a shape dented toward rear and front sides of the cleaner body 110.

A portion or front of the dust container 140 is accommodated in the dust container accommodation part 113. In this case, the other portion or rear of the dust container 140 may be formed to protrude toward the rear of the cleaner body 110 (i.e., in a reverse direction R opposite to the forward direction F).

An entrance 140a (see FIG. 18) through which air containing dust is introduced and an exit 140b (see FIG. 18) through which air having dust separated therefrom is discharged are formed in the dust container 140. When the dust container 140 is mounted in the dust container accommodation part 113, the entrance or inlet 140a and the exit or outlet 140b are configured to respectively communicate with a first opening 110a (see FIG. 24) and a second opening 110b (see FIG. 19), which are formed in an inner wall of the dust container accommodation part 113.

An intake flow path in the cleaner body 110 corresponds to a flow path from an introduction port communicating with a communication part 120b" to the first opening 110a, and an exhaust flow path in the cleaner body 110 corresponds to a flow path from the second opening 110b to an exhaust port 112.

According to such an air flow connection relationship, air containing foreign substances, which is introduced through the suction unit 120, is introduced into the dust container 140 via the intake flow path in the cleaner body 110, and the foreign substances are separated from the sucked air by passing through at least one cyclone provided in the dust container 140. The foreign substances, e.g., dust is collected in the dust container 140, and the air is discharged from the dust container 140. The filtered air is discharged to the outside through the exhaust port 112 by passing through the exhaust flow path in the cleaner body 110.

Figure 4:
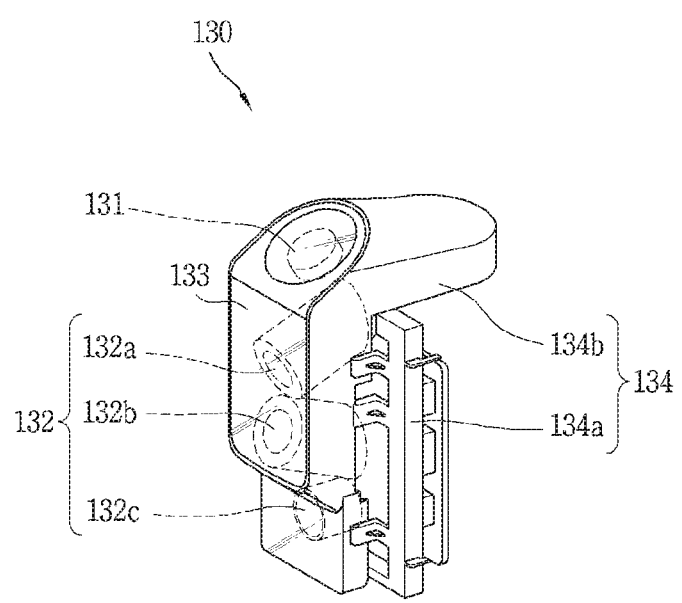
FIG. 4 is a view illustrating a sensing unit shown in FIG. 1.
Figure 5:
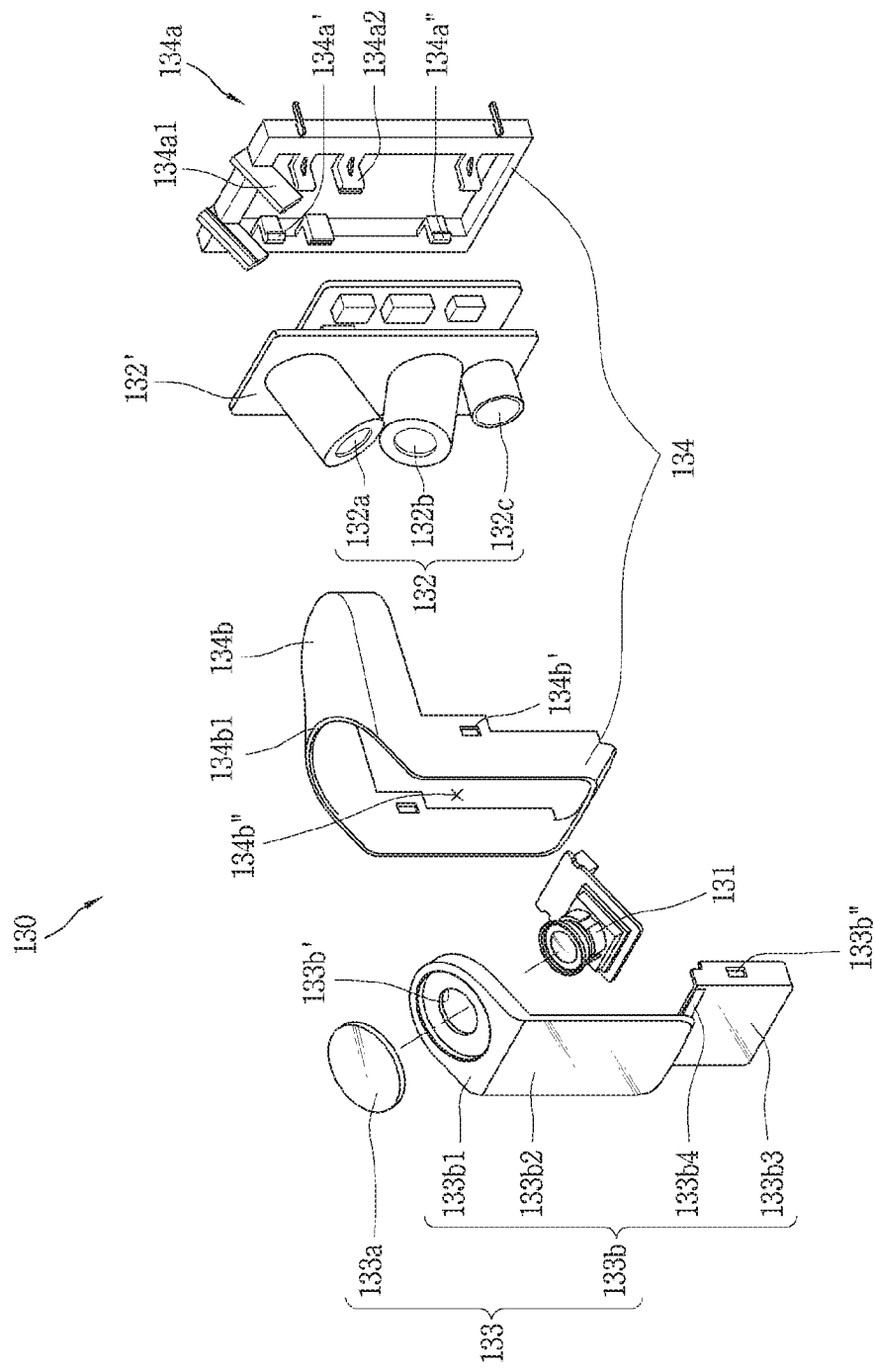
FIG. 5 is an exploded perspective view of the sensing unit shown in FIG. 4.
Figure 6:
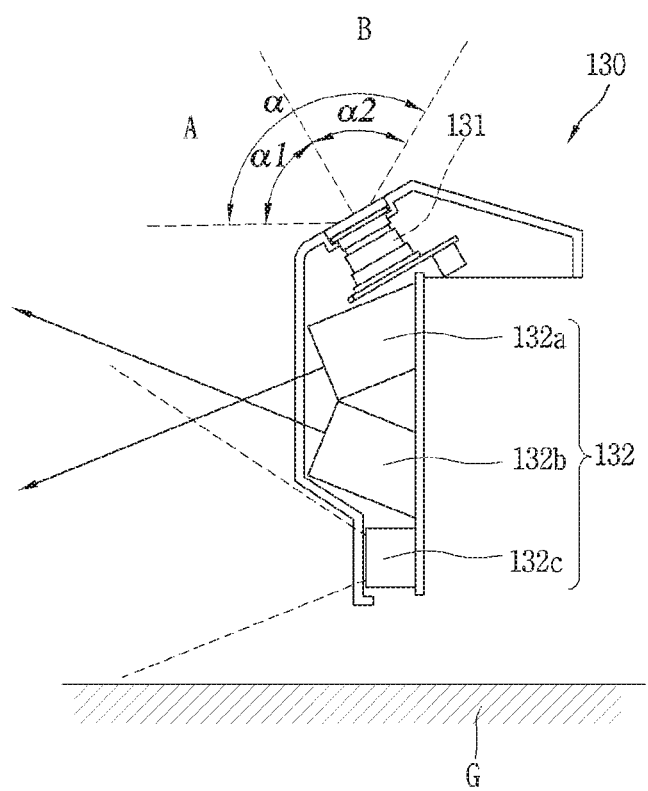
FIG. 6 is a view illustrating a section of the sensing unit shown in FIG. 4.

Referring to FIGS. 4 to 6, the sensing unit 130 includes a first sensing part 131 and a second sensing part 132. The first sensing part 131 (first image sensor) is provided inclined with respect to one surface of the cleaner body 110 to simultaneously photograph front and upper parts of the cleaner body 110. A camera may be used as the first sensing part 131. The camera may be inclined relative to a floor surface as a surface parallel to the floor, or the top or side surface of the cleaner body 110. For example, the first sensing part 131 may be provided inclined at 30 degrees with respect to the top surface of the cleaner body 110.

The first sensing part 131 may be located at an upper corner portion at which the top and side surfaces of the cleaner body 100 meet each other. For example, the first sensing part 131 may be provided at a middle upper corner portion of the cleaner body 110 to be inclined with respect to each of the top and side surfaces of the cleaner body 110. As the first sensing part 131 is provided inclined within a range of acute angles with respect to the one surface of the cleaner body 110, the sensing part 131 is configured to simultaneously photograph the front and upper parts of the cleaner body 110.

Figure 7:
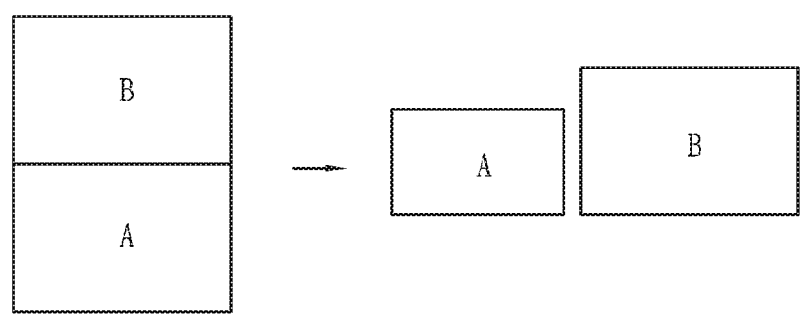
FIG. 7 is a view illustrating separation of an image photographed by a first sensing part shown in FIG. 6.

FIG. 7 in conjunction with FIG. 6 illustrates an image photographed by the first sensing part 131, which is divided into a front image A and an upper image B. The front image A and the upper image B, may be divided based on an angle α of view (field of view) in the top and bottom direction) of the first sensing part 131. An image corresponding to a portion α1 of the angle α of view in the photographed image A+B may be recognized as the front image A, and an image corresponding to the other portion α2 of the angle α of view in the photographed image A+B may be recognized as the upper image B. As shown in FIG. 6, the angle α of view may be an obtuse angle.

The front image A photographed by the first sensing part 131 is used to monitor the front in real time. For example, when the autonomous cleaner 100 is used for household purposes, the front image A photographed by the first sensing part 131 may be used for monitoring or to provide an image of the inside of the house to an electronic device (e.g., a mobile terminal possessed by the user) through a remote connection.

When the front image A photographed by the first sensing part 131 is used for monitoring a house, the following control or operational mode may be performed. The controller may compare fronts images A photographed by the first sensing part 131 at a preset time interval. When the front images A are different from each other, the controller may generate a control signal. The control may be performed in a state in which the cleaner body 110 is stationary. The control signal may be an alarm sound output signal or a transmission signal that provides a notification, a photographed front image, and the like to the electronic device through the remote connection.

When the front image A photographed by the first sensing part 131 is used to provide an image of the inside of the house to the electronic device, the following control or operational mode may be performed. When an image request signal is received by the autonomous cleaner from the electronic device through the remote connection, the controller may ascertain a front image A from an image photographed by the first sensing part 131 and transmit the front image A to the electronic device. The autonomous cleaner may be configured to move to a specific position by controlling driving of the wheel unit 111 and then transmit a front image at the corresponding position to the electronic device.

As shown in FIG. 6, the angle α of view may have a range in which the first sensing part 131 can photograph the upper image B including a ceiling. The upper image B photographed by the first sensing part 131 is used to generate a map of a traveling area and sense or determine a current position in the traveling area. For example, when the autonomous cleaner 100 is used for household purposes, the controller may generate a map of a traveling area, using a boundary between a ceiling and a side surface in the upper image B photographed by the first sensing part 131, and sense or determine a current position in the traveling area based on main feature points of the upper image B. The controller may use both upper image B and the front image A to generate a map of a traveling area and sense or determine a current position in the traveling area.

The second sensing part 132 (second sensor) is provided in a direction intersecting the first sensing part 131 to sense an obstacle or geographic feature located at the front thereof. The second sensing part 132 may be provided along the top-bottom direction at the side surface of the cleaner body 110. The second sensing part 132 includes a first pattern irradiating part or a first light source 132a, a second pattern irradiating part or a second light source 132b, and an image acquisition part or an image sensor 132c.

The first pattern irradiating part 132a is configured to irradiate a beam having a first pattern toward a front lower side or front bottom direction of the autonomous cleaner 100, and the second pattern irradiating part 132b is configured to irradiate a beam having a second pattern toward a front upper side or front upper direction of the autonomous cleaner 100. The first pattern irradiating part 132a and the second pattern irradiating part 132b may be provided in a line along the top-bottom direction of the cleaner body. As an example, the second pattern irradiating part 132b is provided under or below the first pattern irradiating part 132a.

The image acquisition part or second image sensor 132c is configured to photograph, in a preset photographing area, the beams having the first and second patterns, which are respectively irradiated by the first pattern irradiating part 132a and the second pattern irradiating part 132b. The preset photographing area includes an area from the floor to an upper end of the autonomous cleaner 100. The autonomous cleaner 100 may sense or detect an obstacle at the front thereof, and it is possible to prevent the autonomous cleaner 100 from colliding with an upper portion of the cleaner body being stuck or colliding with an obstacle.

The preset photographing area may be, for example, an area within an angle of view of 105 degrees in the top-bottom direction (i.e., the vertical direction), an angle of view of 135 degrees in the left-right direction (i.e., the horizontal direction), and the front of 25 m relative to the cleaner body. The preset photographing area may be changed depending on various factors such as installation positions of the first and second pattern irradiating parts 132a and 132b, irradiation angles of the first and second pattern irradiating parts 132a and 132b, and a height of the autonomous cleaner 100.

The first pattern irradiating part 132a, the second pattern irradiating part 132a, and the image acquisition part 132c may be provided in a line along the top-bottom direction of the cleaner body 110. As illustrated, the image acquisition part 132c is provided under the second pattern irradiating part 132b. The first pattern irradiating part 132a is provided to be downwardly inclined with respect to the side surface of the cleaner body 110, and the second pattern irradiating part 132b is provided to be upwardly inclined with respect to the side surface of the cleaner body 110.

Figure 8:
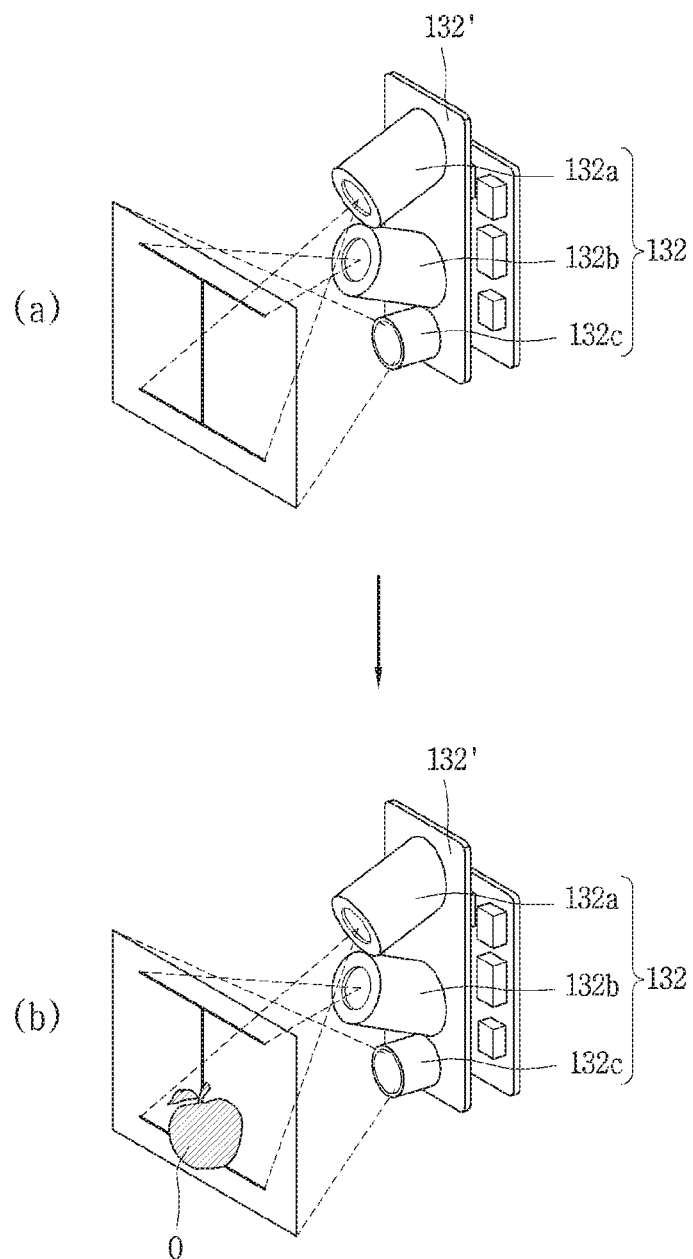
FIG. 8 illustrates sensing of an obstacle by a second sensing part shown in FIG. 4.

Referring to (a) of FIG. 8, the first pattern irradiating part 132a and the second pattern irradiating part 132b are configured to respectively irradiate beams having first and second patterns that have a shape extending at least one direction. As illustrated, the first pattern irradiating part 132a irradiates linear beams intersecting each other and the second pattern irradiating part 132b irradiates a single linear beam. Accordingly, a bottommost beam is used to sense an obstacle at a bottom portion, a topmost beam is used to sense an obstacle at a top portion, and a middle beam between the bottommost beam and the topmost beam is used to sense an obstacle at a middle portion.

For example, as shown in (b) of FIG. 8, when an obstacle O is located at the front, the bottommost beam and a portion of the middle beam may be interrupted or distorted by the obstacle O. When such interruption or distortion is sensed, the image acquisition part 132c transmits an obstacle sensing signal to the controller.

If the obstacle sensing signal is received, the controller determines that the obstacle O is located, and controls the driving of the wheel unit 111. For example, the controller may apply a driving force in the opposite direction to the main wheels 111a such that the autonomous cleaner 100 moves rearward. Alternatively, the controller may apply the driving force to only any one of the main wheels 111a such that the autonomous cleaner 100 rotates, or apply the driving force to both the main wheels 111a in directions different from each other.

Figure 9:
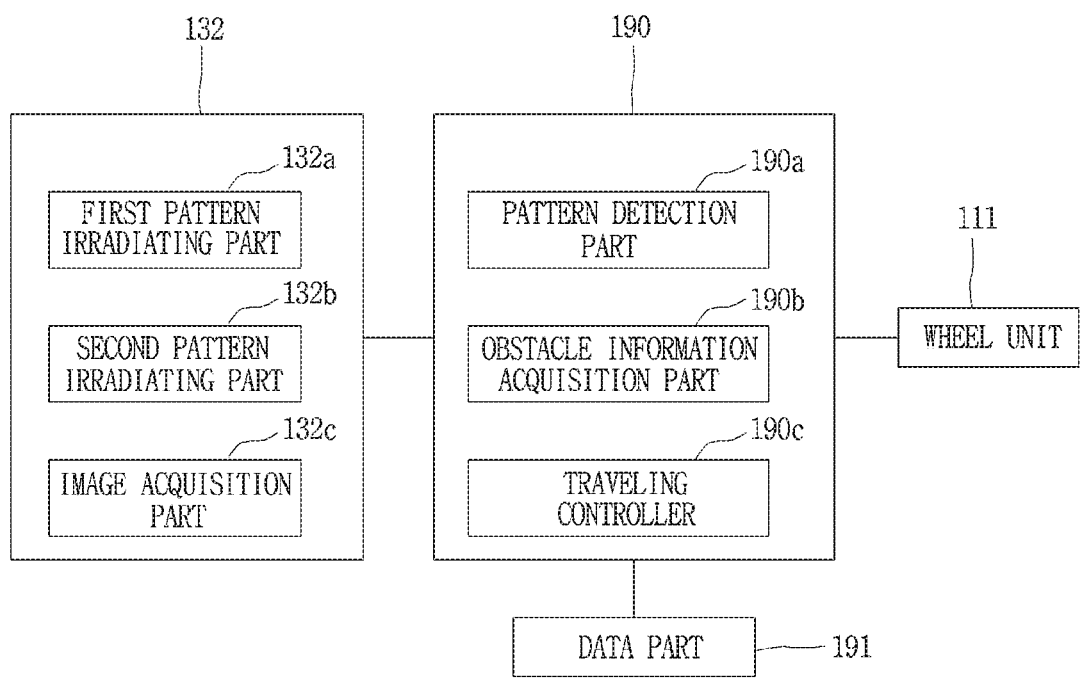
FIG. 9 is a block diagram illustrating main parts related to avoidance of an obstacle using the second sensing part.

FIG. 9 is a block diagram illustrating main parts or components related to avoidance of an obstacle using the second sensing part 132. The autonomous cleaner 100 includes the wheel unit 111, a data part or storage device 191, a second sensing part 132, and a controller 190 that controls overall operations.

The controller 190 may include a traveling or movement controller 190c that controls the wheel unit 111. As a left main wheel 111a and a right main wheel 111a are independently driven by the traveling controller 190c, the autonomous cleaner 100 may move in a straight direction or rotate left or right. A driving motor of which driving is controlled according to a control command of the traveling controller 190c may be connected to each of the left main wheel 111a and the right main wheel 111a.

The controller 190 may include a pattern detection part or pattern detector 190a that detects a pattern by analyzing data input from the second sensing part 132 and an obstacle information acquisition part or module 190b that determines whether an obstacle exists from the detected pattern. The pattern detection part 190a detects beam patterns P1 and P2 from an image (acquired image) acquired by the image acquisition part 132. The pattern detection part 190a may detect features of points, lines, surfaces, and the like with respect to predetermined pixels constituting the acquired image, and detect the beam patterns P1 and P2 or points, lines, surfaces, and the like, which constitute the beam patterns P1 and P2. The obstacle information acquisition part 190b determines whether an obstacle exists based on the patterns detected from the pattern detection part 190a, and determine a shape of the obstacle.

The data part 191 stores reference data that stores an acquired image input from the second sensing part 132 and allows the obstacle information acquisition part 190b to determine whether an obstacle exists. The data part 191 stores obstacle information on a sensed obstacle. The data part 191 stores control data for controlling an operation of the autonomous cleaner 100 and data corresponding to a cleaning mode of the autonomous cleaner 100. The data part 191 stores a map generated or received from the outside. In addition, the data part 191 stores data readable by a microprocessor, and may include a hard disk driver (HDD), a solid state disk (SSD), a silicon disk drive (SDD), a ROM, a RAM, a CD-ROM, a magnetic tape, a floppy disk, and an optical data storage device.

The second sensing part 132 includes the first pattern irradiating part 132a, the second pattern irradiating part 132b, and the image acquisition part 132c. The second sensing part 132 is installed at a front side of the cleaner body 110. In the second sensing part 132, the first and second pattern irradiating parts 132a and 132b irradiate beams P1 and P2 having first and second patterns toward the front of the autonomous cleaner 100, and the image acquisition part 132c acquires an image by photographing the irradiated beams having the patterns.

The controller 190 stores an acquired image in the data part 191, and the pattern detection part 190a extracts a pattern by analyzing the acquired image. The pattern detection part 190a extracts a beam pattern obtained by irradiating a beam having a pattern, which is irradiated from the first pattern irradiating part 132*a* or the second pattern irradiating part 132*b*, onto a floor or obstacle. The obstacle information acquisition part 190*b* determines whether an obstacle exists, based on the extracted beam pattern.

The controller 190 determines whether an obstacle exists through an acquired image input from the second sensing part 132 and controls the wheel unit 111 to travel while avoiding the obstacle by changing a moving direction or traveling route.

When a cliff (e.g., stairs) exists in the vicinity of the autonomous cleaner 100, the autonomous cleaner 100 may fall from the cliff. The controller 190 may sense the cliff through an acquired image, and reconfirm whether the cliff exists through a cliff sensor 124, to control the traveling of the autonomous cleaner 100 such that the autonomous cleaner 100 does not fall from the cliff. When it is determined that a cliff does exist, the controller 190 may control the wheel unit 111 to travel along the cliff by determining a change in beam pattern through an acquired image.

In addition, when the movement of the autonomous cleaner 100 may be restricted due to a plurality of obstacles existing in an area having a certain size or less, the controller 190 may determine whether the autonomous cleaner 100 is in a restricted situation, and set an escape mode such that the autonomous cleaner 100 avoids the restricted situation. The controller 190 may allow the autonomous cleaner 100 to avoid the restricted situation by setting an escape route based on information on each obstacle around the autonomous cleaner 100 according to whether a currently set mode is a fundamental mode or a fast cleaning mode.

For example, in the fundamental mode, the controller 190 may generate a map on a peripheral area by acquiring information on all obstacles around the autonomous cleaner 100 and then set an avoidance route. In the fast cleaning mode, the controller 190 may set an avoidance route by determining whether the autonomous cleaner 100 is to enter according to a distance between sensed obstacles.

The controller 190 determines a distance between sensed obstacles by analyzing a beam pattern of an acquired image with respect to the sensed obstacles, and determines that the autonomous cleaner 100 is to travel and enter when the distance between the obstacles is a certain value or more, to control the autonomous cleaner 100 to travel. Thus, the controller 190 enables the autonomous cleaner 100 to escape a restricted situation.

Figure 10:
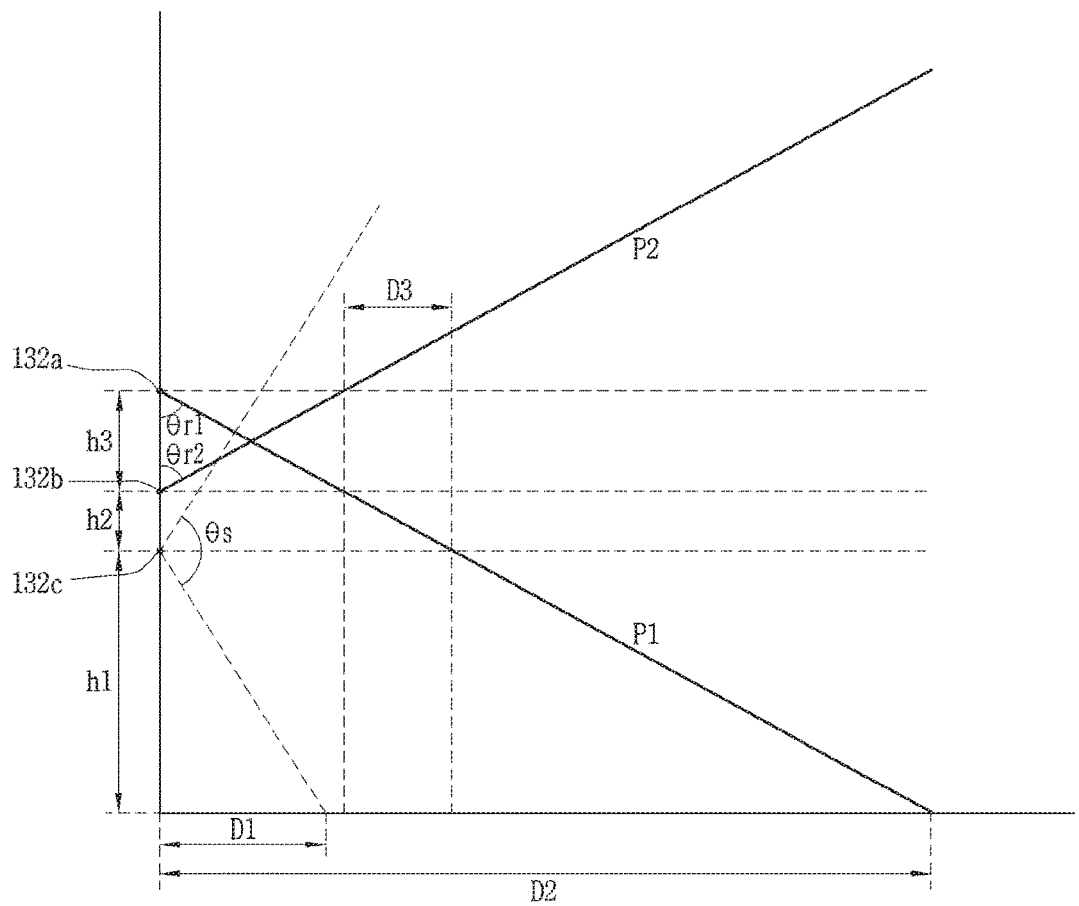
FIG. 10 is a view illustrating a beam irradiation range of first and second pattern irradiating parts and an obstacle detection range of an image acquisition part.

FIG. 10 is a view illustrating a beam irradiation range of the first and second pattern irradiating parts 132*a* and 132*b* and an obstacle detection range of the image acquisition part 132*c*. Each of the first and second pattern irradiating parts 132*a* and 132*b* may include a beam source and an optical pattern projection element (OPPE) that generates a beam having a predetermined pattern as a beam irradiated from the beam source is transmitted therethrough.

The beam source may be a laser diode (LD), a light emitting diode (LED), or the like. Since a laser beam has characteristics of monochromaticity, straightness, and connectivity, the laser diode is superior to other beam sources, and thus can accurately measure a distance. In particular, since an infrared or visible ray has a large variation in accuracy of distance measurement depending on factors such as a color and a material of an object, the laser diode is used as the beam source.

A pattern generator may include a lens and a diffractive optical element (DOE). Beams having various patterns may be irradiated according to a configuration of a pattern generator provided in each of the first and second pattern irradiating parts 132*a* and 132*b*. The first pattern irradiating part 132*a* may irradiate a beam P1 having a first pattern (hereinafter, referred to as a first pattern beam) toward a front lower side of the cleaner body 110. The first pattern beam P1 may be incident onto a floor of a cleaning area. The first pattern beam P1 may be formed in the shape of a horizontal line. The first pattern beam P1 may be formed in the shape of a cross pattern in which a horizontal line and a vertical line intersect each other.

The first pattern irradiating part 132*a*, the second pattern irradiating part 132*b*, and the image acquisition part 132*c* may be vertically aligned. As illustrated, the image acquisition part 132*c* is provided under the first pattern irradiating part 132*a* and the second pattern irradiating part 132*b*. However, the present disclosure is not necessarily limited thereto, and the image acquisition part 132*c* may be provided above the first pattern irradiating part 132*a* and the second pattern irradiating part 132*b*.

The first pattern irradiating part 132*a* may also sense an obstacle located lower than the first pattern irradiating part 132*a* by downwardly irradiating the first pattern beam P1 toward the front, and the second pattern irradiating part 132*b* may be located at a lower side of the first pattern irradiating part 132*a* to upwardly irradiate a beam P2 having a second pattern (hereinafter, referred to as a second pattern beam) toward the front. The second pattern beam P2 may be incident onto an obstacle or a certain portion of the obstacle, which is located higher than at least the second pattern irradiating part 132*b* from the floor of the cleaning area. The second pattern beam P2 may have a pattern different from that of the first pattern beam P1, and may be configured to include a horizontal line. The horizontal line is not necessarily a consecutive line segment but may be formed as a dotted line.

Meanwhile, a horizontal irradiation angle of the first pattern beam P1 irradiated from the first pattern irradiating part 132*a* (e.g., an angle made by both ends of the first pattern beam P1 and the first pattern irradiating part 132*a*) may be defined in a range of 130 degrees to 140 degrees, but the present disclosure is not necessarily limited thereto. The first pattern beam P1 may be formed in a shape symmetrical with respect to the front of the autonomous cleaner 100.

Like the first pattern irradiation part 132*a*, a horizontal irradiation angle of the second pattern irradiating part 132*b* may be defined in a range of 130 degrees to 140 degrees. In some other embodiments, the second pattern irradiating part 132*b* may irradiate the second pattern beam P2 at the same horizontal irradiation angle as the first pattern irradiating part 132*a*. In this case, the second pattern beam P2 may also be formed in a shape symmetrical with respect to the front of the autonomous cleaner 100.

The image acquisition part 132*c* may acquire an image of the front of the cleaner body 110. The pattern beams P1 and P2 are shown in an image acquired by the image acquisition part 132*c* (hereinafter, referred to as an acquired image). Hereinafter, images of the pattern beams P1 and P2 shown in the acquired image are referred to as beam patterns. Since the beam patterns are images formed as the pattern beams P1 and P2 incident onto an actual space are formed in an image sensor, the beam patterns are designated by the same reference numerals as the pattern beams P1 and P2. Images corresponding to the first pattern beam P1 and the second pattern beam P2 are referred to as a first beam pattern P1 and a second beam pattern P2, respectively.

The image acquisition part 132 may include a digital image acquisition part that converts an image of a subject into an electrical signal and then converts the electrical signal into a digital signal to be stored in a memory device.

The digital image acquisition part may include an image sensor and an image processing part or processor.

The image sensor is a device that converts an optical image into an electrical signal, and is configured as a chip having a plurality of photo diodes integrated therein. An example of the photo diode may be a pixel. Electric charges are accumulated in each of the pixels by an image formed in the chip through a beam passing through a lens. The electric charges accumulated in the pixel are converted into an electric signal (e.g., a voltage). A charge coupled device (CCD), a complementary metal oxide semiconductor (CMOS), and the like are well known as the image sensor.

The image processing part generates a digital image, based on an analog signal output from the image sensor. The image processing part may include an AD converter that converts an analog signal into a digital signal, a buffer memory that temporarily records digital data according to the digital signal output from the AD converter, and a digital signal processor (DSP) that generates a digital image by processing the data recorded in the buffer memory.

The pattern detection part 190a may detect features of points, lines, surfaces, and the like with respect to predetermined pixels constituting an acquired image, and detect the beam patterns P1 and P2 or points, lines, surfaces, and the like, which constitute the beam patterns P1 and P2. For example, the pattern detection part 190a may extract a horizontal line constituting the first beam pattern P1 and a horizontal line constituting the second beam pattern P2 by extracting line segments configured as pixels brighter than surroundings are consecutive. However, the present disclosure is not limited thereto. Since various techniques of extracting a pattern having a desired shape from a digital image have already been well known in the art, the pattern detection part 190a may extract the first beam pattern P1 and the second beam pattern P2 using these techniques.

The first pattern irradiating part 132a and the second pattern irradiating part 132b are vertically provided to be spaced apart from each other at a distance h3. The first pattern irradiating part 132a downwardly irradiates a first pattern beam, and the second pattern irradiating part 132b upwardly irradiates a second pattern beam, so that the first and second pattern beams intersect each other.

The image acquisition part 132c is provided downward from the second pattern irradiating part 132b at a distance h2 to photograph an image of the front of the cleaner body 110 at an angle θs of view with respect to the top-bottom direction. The image acquisition part 132c is installed at a position spaced apart from the bottom surface at a distance h1. The image acquisition part 132c may be preferably installed at a position that does not interfere with the photographing of an image of the front, by considering the shape of the suction unit 120.

Each of the first pattern irradiating part 132a and the second pattern irradiating part 132b is installed such that a direction in which the direction of optical axes of lenses constituting each of the first pattern irradiating part 132a and the second pattern irradiating part 132b forms a certain irradiation angle.

The first pattern irradiating part 132a downwardly irradiates the first pattern beam P1 at a first irradiation angle θr1, and the second pattern irradiating part 132b upwardly irradiates the second pattern beam P2 at a second irradiation angle θr2. The first irradiation angle θr1 and the second irradiation angle θr2 are basically different from each other, but may be set equal to each other in some cases. The first irradiation angle θr1 and the second irradiation angle θr2 may be preferably set in a range of 50 degrees to 75 degrees, but the present disclosure is not necessarily limited thereto. For example, the first irradiation angle θr1 may be set to 60 degrees to 70 degrees, and the second irradiation angle θr2 may be set to 50 degrees to 55 degrees. The first irradiation angle θr1 and the second irradiation angle θr2 may be changed depending on the shape of the suction unit 120 and the height of an upper portion to be sensed.

When a pattern beam irradiated from the first pattern irradiating part 132a and/or the second pattern irradiating part 132b is incident onto an obstacle, the positions of the beam patterns P1 and P2 in an acquired image may be changed depending on a position at which the obstacle is distant from the first pattern irradiating part 132a. For example, when the first pattern beam P1 and the second pattern beam P2 are incident onto a predetermined obstacle, the first beam pattern P1 is displayed at a higher position in the acquired image as the obstacle is located closer to the autonomous cleaner 100. On the contrary, the second beam pattern P2 is displayed at a lower position in the acquired image as the obstacle is located more distant from the autonomous cleaner 100.

Data on distances to an obstacle, which correspond to rows (lines configured with pixels arranged in the lateral direction) constituting an image generated by the image acquisition part 132c, is stored in advance. If the beam patterns P1 and P2 detected in the image acquired through the image acquisition part 132c are detected on a predetermined row, a position of the obstacle may be estimated from data on a distance to the obstacle, which corresponds to the row. The angle θs of view of the image acquisition part 132c may be set to a value of 100 degrees or more, and be preferably set to 100 degrees to 110 degrees. However, the present disclosure is not necessarily limited thereto.

In addition, the distance from the floor of the cleaning area to the image acquisition part 132c may be set to about 60 mm to 70 mm. In this case, the floor of the cleaning area in the image acquired by the image acquisition part 132c is shown posterior to D1 from the image acquisition part 132c, and D2 is a position at which the first beam pattern P1 is displayed on the floor shown in the acquired image.

When an obstacle is located in D2, an image in which the first beam pattern P1 is incident onto the obstacle may be acquired by the image acquisition part 132c. When the obstacle comes closer to the autonomous cleaner 100 than D2, the first optical pattern is displayed upward of a reference position ref1, corresponding to the incident first pattern beam P1.

The distance from the cleaner body 110 to D1 may be 100 mm to 150 mm, and the distance from the cleaner body 110 to D2 may be preferably 180 mm to 280 mm. However, the present disclosure is not necessarily limited thereto. Meanwhile, D3 represents a distance from a most protruding portion of the front of the cleaner body 110 to a position at which the second pattern beam is incident. Since the cleaner body 110 senses an obstacle during traveling, D3 is a minimum of distance at which the cleaner body 110 can sense the obstacle at the front (upper portion) thereof without colliding with the obstacle. D3 may be set to about 23 mm to 30 mm.

When the first beam pattern P1 shown in an acquired image disappears in a normal state during traveling of the cleaner body 110 or when a portion of the first beam pattern is displayed in the acquired image, the obstacle information acquisition part 190b determines that a cliff exists in the vicinity of the autonomous cleaner 100.

When the first beam pattern P1 is not displayed in the acquired image, the obstacle information acquisition part 190*b* may recognize that a cliff exists at the front of the autonomous cleaner 100. When a cliff (e.g., stairs) exists at the front of the autonomous cleaner 100, the first pattern beam is not incident onto the floor, and therefore, the first beam pattern P1 disappears in the acquired image.

The obstacle information acquisition part 190*b* may determine that a cliff exists at the front distant by D2 from the cleaner body 110, based on a length of D2. In this case, when the first beam pattern P1 has a cross shape, the horizontal line disappears and only the vertical line is displayed. Therefore, the obstacle information acquisition part 190*b* may determine that a cliff exists.

In addition, when a portion of the first beam pattern is not displayed, the obstacle information acquisition part 190*b* may determine that a cliff exists at the left or right side of the autonomous cleaner 100. When a right portion of the first beam pattern is not displayed, the obstacle information acquisition part 190*b* may determine that a cliff exists at the right side of the autonomous cleaner 100. Based on detected information on a cliff, the obstacle information acquisition part 190*b* can control the wheel unit 111 to travel along a route on which the autonomous cleaner 100 does not fall from the cliff.

When a cliff exists at the front of the autonomous cleaner 100, the traveling controller 190*c* may again check whether a cliff exists, using a cliff sensor installed at a lower portion of the cleaner body 110, by moving forward by a certain distance, e.g., D2 or less. The autonomous cleaner 100 can primarily check whether a cliff exists through an acquired image and secondarily check whether a cliff exists through the cliff sensor.

Figure 11:
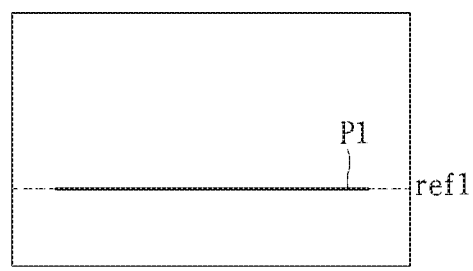
FIG. 11 is a view illustrating a beam having a first pattern, irradiated by the first pattern irradiating part.
Figure 11:
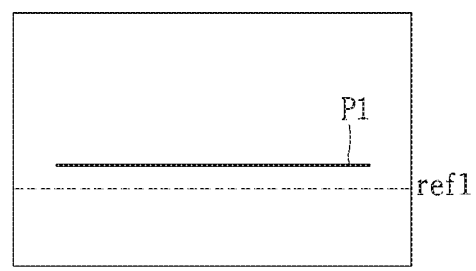
Figure 11:
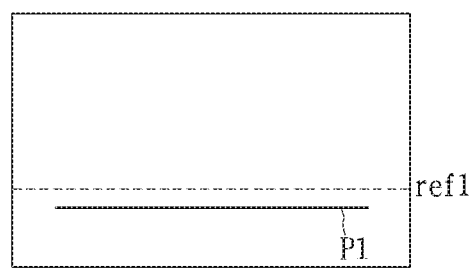
Figure 11:
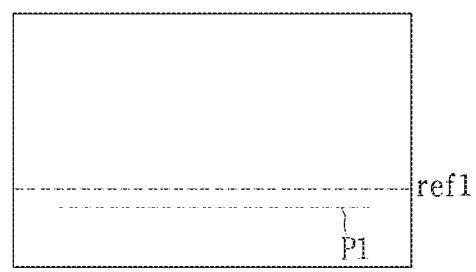
Figure 11:
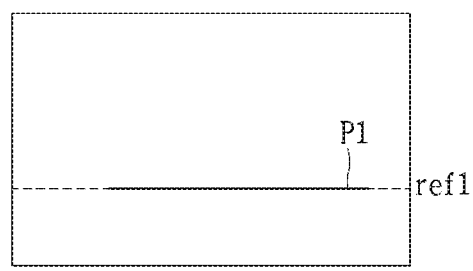

FIG. 11 is a view illustrating a beam having a first pattern, irradiated by the first pattern irradiating part 132*a*. The pattern detection part 190*a* detects a first beam pattern or a second beam patter from an acquired image input from the image acquisition part 132*c* and applies the first or second beam pattern to the obstacle information acquisition part 190*b*. The obstacle information acquisition part 190*b* analyzes the first or second beam pattern detected from the acquired image and compares a position of the first beam pattern with the reference position ref1, thereby determining whether an obstacle exists.

As shown in (a) of FIG. 11, when the horizontal line of the first beam pattern P1 is located at the reference position ref1, the obstacle information acquisition part 190*b* determines that a current state is a normal state. The normal state is a state in which the floor is even and flat, and is a state in which the autonomous cleaner 100 can continuously travel as any obstacle does not exist at the front of the autonomous cleaner.

The second beam pattern P2 is incident onto an obstacle only when the obstacle exists at an upper portion of the front to be displayed in an acquired image. The second beam pattern P2 is not generally displayed in the acquired image in the normal state.

As shown in (b) of FIG. 11, when the horizontal line of the first beam pattern P1 is located above the reference position ref1, the obstacle information acquisition part 190*b* determines that an obstacle exists at the front. If an obstacle is detected through the obstacle information acquisition part 190*b* as described above, the traveling controller 190*c* controls the wheel unit 111 to travel while avoiding the obstacle. Meanwhile, the obstacle information acquisition part 190*b* may determine the position and size of the sensed obstacle, corresponding to the positions of the first and second beam patterns P1 and P2 and whether the second beam pattern P2 has been displayed. In addition, the obstacle information acquisition part 190*b* may determine the position and size of the obstacle, corresponding to changes of the first and second beam patterns P1 and P2 displayed in the acquired image during traveling.

The traveling controller 190*c* controls the wheel unit 111 by determining whether the wheel unit 111 is to continuously travel with respect to the obstacle or to travel while avoiding the obstacle, based on information of the obstacle, which is input from the obstacle information acquisition part 190*b*. For example, when the height of the obstacle is lower than a certain height or less or when the cleaner body 110 is to enter into a space between the obstacle and the floor, the traveling controller 190*c* determines that the traveling of the wheel unit 111 is possible.

As shown in (c) of FIG. 11, the first beam pattern P1 may be displayed at a position lower than the reference position ref1. When the first beam pattern P1 may be displayed at a position lower than the reference position ref1, the obstacle information acquisition part 190*b* determines that a downhill road exists. In the case of a cliff, the first beam pattern P1 disappears, and therefore, the downhill road is distinguished from the cliff.

As shown in (d) of FIG. 11, the obstacle information acquisition part 190*b* determines that a cliff exists in a traveling direction when the first beam pattern P1 is not displayed. As shown in (e) of FIG. 11, when a portion of the first beam pattern P1 is not displayed, the obstacle information acquisition part 190*b* may determines that a cliff exists at the left or right side of the cleaner body 110. In this case, the obstacle information acquisition part 190*b* determines that a cliff exists at the left side of the cleaner body 110. Meanwhile, when the first beam pattern P1 has a cross shape, an obstacle may be determined by considering both the position of the horizontal line and the length of the vertical line.

Figure 12:
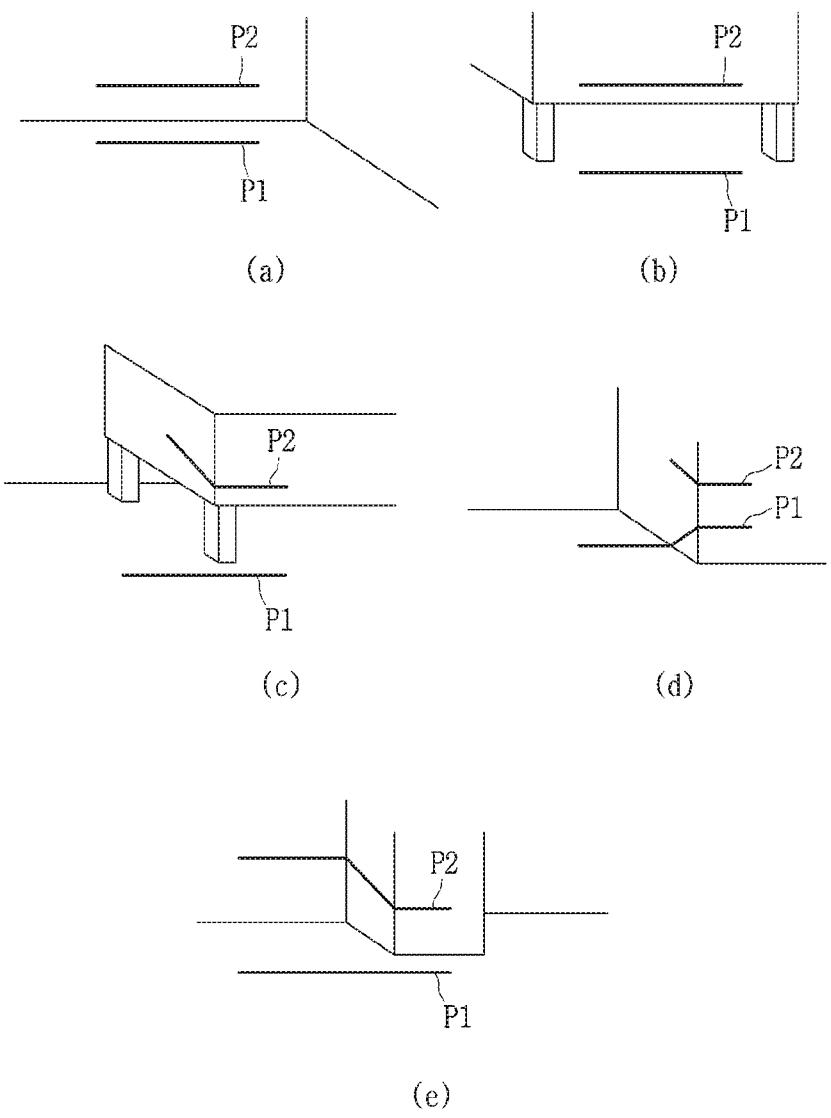
FIG. 12 is a view illustrating shapes of first and second beam patterns irradiated onto each obstacle for each shape of the obstacle.
Figure 13:
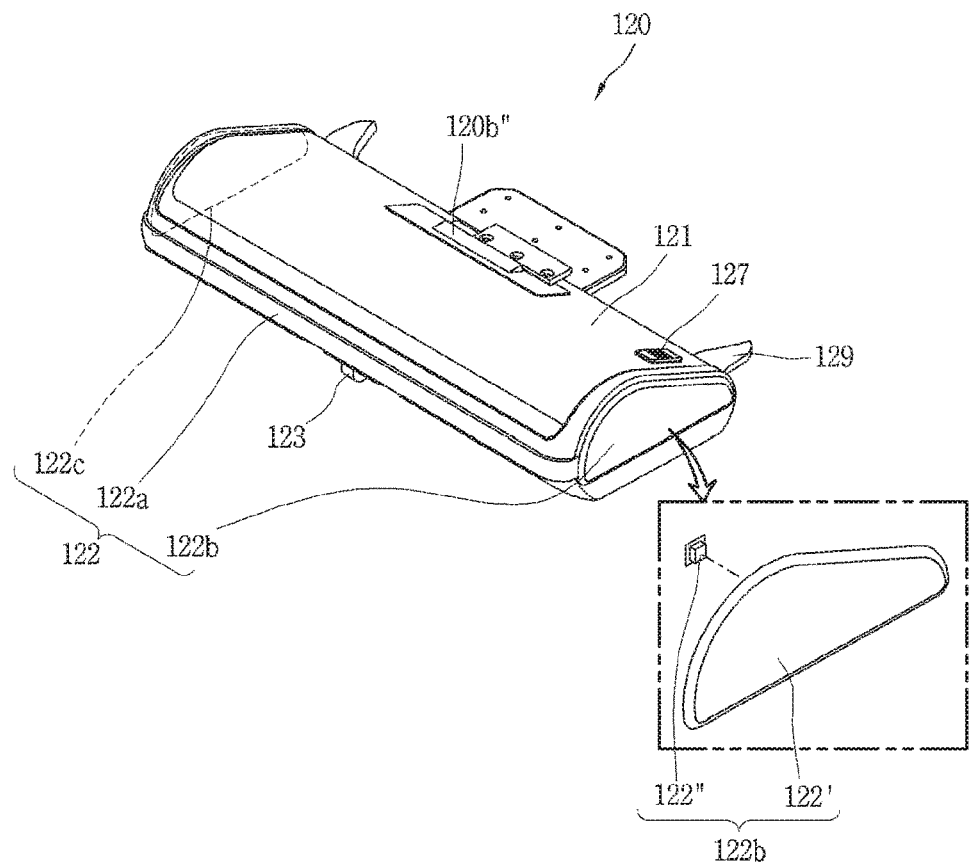
FIG. 13 is a view illustrating a suction unit shown in FIG. 1.
Figure 14:
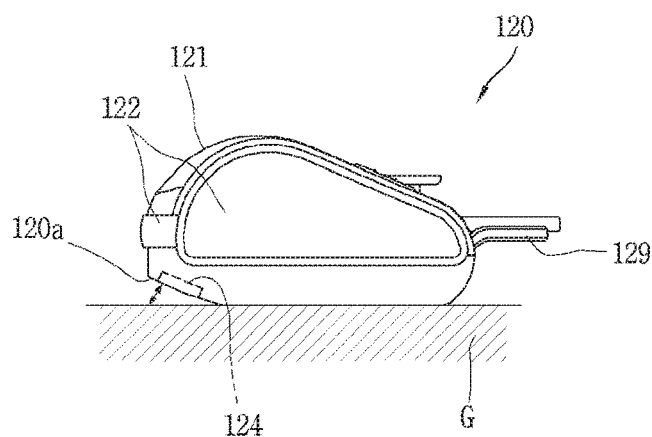
FIG. 14 is a side view of the suction unit shown in FIG. 13.
Figure 15:
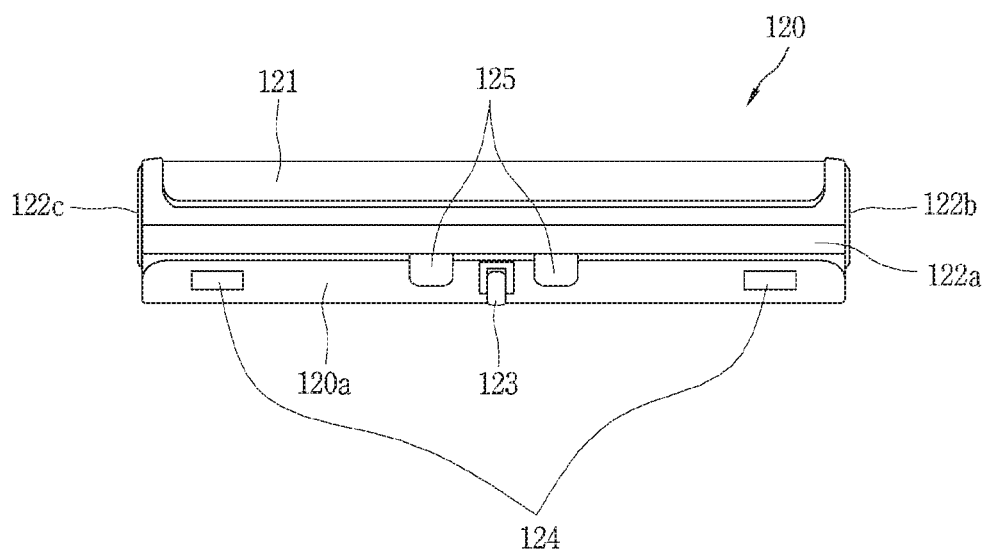
FIG. 15 is a front view of the suction unit shown in FIG. 13.
Figure 16:
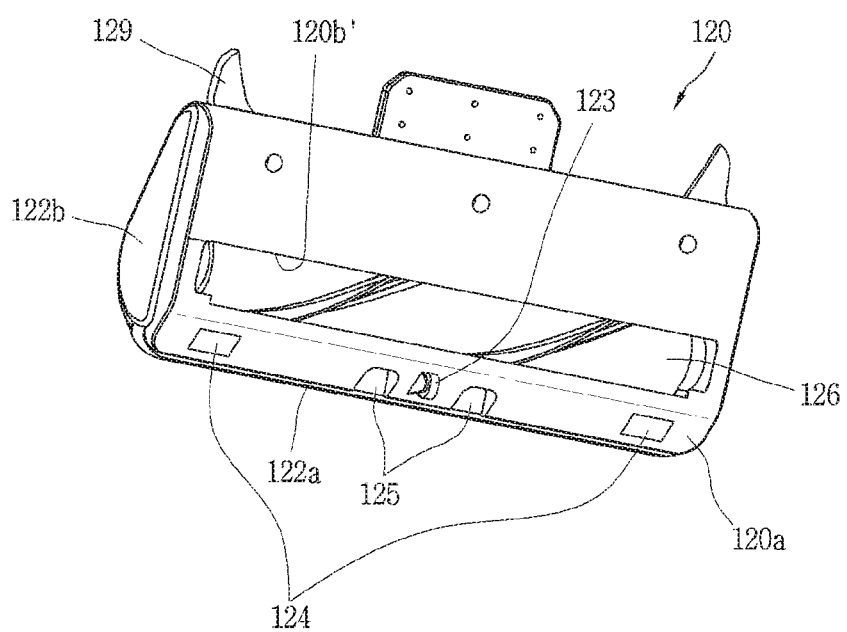
FIG. 16 is a view illustrating a bottom portion of the suction unit shown in FIG. 13.

FIG. 12 illustrates shapes of the first and second beam patterns P1 and P2 irradiated onto each obstacle for each shape of the obstacle. As beams irradiated from the first and second pattern irradiating parts 132*a* and 132*b* are incident onto an obstacle, so that beam patterns are shown in an acquired image, the obstacle information acquisition part 190*b* may determine the position, size, and shape of the obstacle.

As shown in (a) of FIG. 12, when a wall surface exists at the front during traveling of the cleaner body 110, a first pattern beam is incident onto a floor and a second pattern beam is incident onto the wall surface. The first beam pattern P1 and the second beam pattern P2 are displayed as two horizontal lines in an acquired image. When a distance of the cleaner body 110 to the wall surface is longer than D2, the first beam pattern P1 is displayed at the reference position ref1, but the second beam pattern P2 is also displayed together with the first beam pattern P1. Therefore, the obstacle information acquisition part 190*b* may determine that an obstacle exists.

Meanwhile, when the distance of the cleaner body 110 to the wall surface is less than D2, the first pattern beam is incident onto the wall surface instead of the floor. Therefore, the first beam pattern P1 is displayed at an upper side of the reference position ref1, and the second beam pattern P2 is displayed at an upper side of the first beam pattern P1. Since the position of the second beam pattern P2 is displayed at a lower side as the second beam pattern P2 approaches the obstacle, the second beam pattern P2 is displayed at a lower side as compared with when the distance of the cleaner body 110 to the wall surface is longer than D2. The second pattern beam P2 is displayed at an upper side as compared with the reference position ref1 and the first beam pattern P1. Accordingly, the obstacle information acquisition part 190b can calculate a distance of the cleaner body 110 to the wall surface as an obstacle through the first beam pattern P1 and the second beam pattern P2.

As shown in (b) of FIG. 12, when an obstacle such as a bed or a dresser exists, the first beam pattern P1 and the second beam pattern P2 are incident as two horizontal lines onto a floor and an obstacle, respectively. The obstacle information acquisition part 190b determines whether an obstacle exists, based on the first beam pattern P1 and the second beam pattern P2. The height of the obstacle may be determined based on a position of the second beam pattern P2 and a change of the second beam pattern P2, which occurs while the cleaner body 110 is approaching the obstacle. Accordingly, the traveling controller 190c controls the wheel unit 111 by determining whether the cleaner body 110 is to enter into a lower space of the obstacle. For example, when an obstacle having a predetermined space formed from the floor, such as a bed in a cleaning area, is located, the traveling controller 190c may recognize the space, and preferably determine whether to pass through or avoid the obstacle by detecting the height of the space.

When it is determined that the height of the space is lower than that of the cleaner body 110, the traveling controller 190c may control the wheel unit 111 such that the cleaner body 110 travels while avoiding the obstacle. On the other hand, when it is determined that the height of the space is higher than that of the cleaner body 110, the traveling controller 190 may control the wheel unit 111 such that cleaner body 110 enters into or passes through the space.

Although the first beam pattern P1 and the second beam pattern P2 are displayed as two horizontal lines even in (a) of FIG. 12, a distance between the first beam pattern P1 and the second beam pattern P2 in (b) of FIG. 12 is different from that between the first beam pattern P1 and the second beam pattern P2 in (a) of FIG. 12. Therefore, the obstacle information acquisition part 190b may distinguish the difference. In (a) of FIG. 12, the position of the first beam pattern P1 is displayed higher than the reference position ref1 as the first beam pattern approaches the obstacle. However, as shown in (b) of FIG. 12, when an obstacle is located above the cleaner body 110, the first beam pattern P1 is displayed at the reference position ref1 and the position of the second beam pattern P2 is changed even when they approach the obstacle by a certain distance. The obstacle information acquisition part 190b may distinguish the kind of the obstacle.

As shown (c) of FIG. 12, in the case of a corner of an obstacle such as a bed or dresser, as the first beam pattern P1 is irradiated as a horizontal line onto a floor, and the second beam pattern P2 is irradiated onto the corner of the obstacle. As the second beam pattern P2 is irradiated onto the corner of the obstacle, a portion of the second beam pattern P2 is displayed as a horizontal line, and the other portion of the second beam pattern P2 is displayed as an oblique line. Since the position of the second beam pattern P2 becomes higher as the second beam pattern P2 is more distant from the cleaner body 110, the second beam pattern P2 irradiated onto a side surface of the obstacle is displayed as an oblique line bent upward of the horizontal line irradiated onto a front surface of the obstacle.

As shown in (d) of FIG. 12, when the cleaner body 110 approaches a corner of a wall surface by a certain distance or more, a portion of the first beam pattern P1 is displayed as a horizontal line at an upper side of the reference position ref1. As a portion of the second beam pattern P2 is irradiated onto a side surface of the corner, the portion of the second beam pattern P2 is displayed as an oblique line bent downward. As for a bottom surface, a portion of the second beam pattern P2 is displayed as a horizontal line at the reference position ref1.

Meanwhile, a portion of the second beam pattern P2 is displayed as a horizontal line as shown in (c) of FIG. 12, and a portion of the second beam pattern P2, which is irradiated onto the side surface of the corner, is displayed as an oblique line bent upward.

As shown in (e) of FIG. 12, in the case of an obstacle protruding from a wall surface, the first beam pattern P1 is displayed as a horizontal line as the reference position ref1. A portion of the second beam pattern P2 is displayed as a horizontal line on a protruding surface, another portion of the second beam pattern P2 is displayed as an oblique line bent upward on a side surface of the protruding surface, and the other portion of the second beam pattern P2 is displayed as a horizontal line on the wall surface.

Accordingly, the obstacle information acquisition part 190b can determine the position, shape, and size (height) of an obstacle, based on the positions and shapes of first and second pattern beams.

Additional details of the first sensor and second sensor are disclosed in U.S. application Ser. No. 15/597,333 filed on May 17, 2017 or Korean Application No. 10-2016-0060444 filed May 17, 2016, and Korean Application No. 10-2016-0014116 filed on Oct. 27, 2016, whose entire disclosure is incorporated herein by reference.

Referring to FIG. 5, the sensing unit 130 further includes a window part or assembly 133 and a case 134, in addition to the first sensing part 131 and the second sensing part 132. The window part 133 is provided to cover the first and second sensing parts 131 and 132, and has transparency. The transparency is a property that at least one portion of an incident beam is transmitted, and is translucent.

The window part 133 may be formed of a synthetic resin material or a glass material. When the window part 133 has the translucency, the material may be formed to have the translucency. Further, the material may have the transparency, and a film attached to the material may have the translucency.

The case 134 is mounted to the cleaner body 110, and is configured to fix the first and second sensing parts 131 and 132 and the window part 133. As shown in this figure, the case 134 is configured to accommodate at least one portion of the window part 133. The case 134 may be formed of a synthetic resin material or a metallic material, and has opaqueness.

As shown in this figure, the case 134 may include a mounting frame 134a and the cover frame 134b. The mounting frame 134a provides a space in which the first and second sensing parts 131 and 132 are mounted and supported. The mounting frame 134a may be provided with a first mounting part 134a1 (e.g., inclined protrusions) for mounting the first sensing part 131 thereto and a second mounting part 134a2 (e.g., tabs) for mounting the second sensing part 132 thereto. A board or a substrate 132' on which the first and second pattern irradiating parts 132a and 132b and the image acquisition part 132c are mounted may be mounted to the second mounting part 134a2. The second mounting part 134a2 may be provided inclined with respect to the first mounting part 134a1.

The mounting frame 134a is provided with first and second fastening hooks 134a' and 134a" for allowing the mounting frame 134a to be fastened to the cover frame 134b and the window part 133. The first fastening hook 134a' is fastened to a fastening hole 134b' of the cover frame 134b, and the second fastening hook 134a" is fastened to a fastening hole 133b" of the window part 133. The mounting frame 134a may be mounted to the cleaner body 110.

The cover frame 134b is mounted to the cleaner body 110 in a state in which the cover frame 134b is coupled to the mounting frame 134a and accommodates at least one portion of the window part 133. The cover frame 134b may be formed in an 'L' shape to cover top and side surfaces of the cleaner body 110 at a corner of the cleaner body 110.

The upper end 134b1 of the cover frame 134b is located at an upper side of the first sensing part 131, and may be formed inclined to have a sharp shape. According to the above-described shape, although the autonomous cleaner 100 is inserted into furniture or a gap during traveling thereof, the autonomous cleaner 100 can easily escape from the furniture or gap, and the first and second sensing parts 131 and 132 can be protected by the upper end 134b1 located upward of the first and second sensing parts 131 and 132. In this figure, a case where the upper end 134b1 is formed at an end portion of a hole 134b" which will be described later is illustrated as an example.

The first sensing part 131 and at least one portion of the second sensing part 132 may be accommodated in the hole 134b" formed inside the cover frame 134b. As illustrated, the first sensing part 131 and the first and second pattern irradiating parts 132a and 132b of the second sensing part 132 are accommodated in the hole 134b".

The window part 133 may include a first window 133a and a second window 133b. The first window 133a is formed of a transparent material, and is provided to cover the first sensing part 131. The second window 133b is translucent, and is provided to cover the second sensing part 132. As illustrated, a through-hole 133b' may be formed at a portion of the second window part 133b, which corresponds to the first sensing part 131, and the first window 133a may be provided to cover the through-hole 133b'.

As the first window 133a is formed of a transparent material, images at the front and upper parts of the cleaner body 110 can be clearly photographed. Further, as the second window 133b is translucent, the first pattern irradiating part 132a, the second pattern irradiating part 132b, and the image acquisition part 132c on a rear surface of the second window 133b are not noticeable by the naked eye from the outside for a clean appearance.

The second window 133b may be divided in a first part 133b1 (first window cover), a second part 133b2 (second window cover), an extension part 133b4 (extension cover), and a third part 133b3 (third window cover).

The first part 133b1 is a part having the through-hole 133b', and is provided inclined with respect to the top surface of the cleaner body 110. The first window 133a mounted in the through-hole 133b' is provided to cover the first sensing part 131.

The second part 133b2 downwardly extends in an inclined shape from the first part 133b1, and is provided to cover the first and second pattern irradiating parts 132a and 132b. As illustrated, the second part 133b2 downwardly extends in parallel to the side surface of the cleaner body 110.

The extension part 133b4 downwardly extends from the second part 133b2, and is covered by the cover frame 134b. As illustrated, the extension part 133b4 may downwardly extend toward the inside of the second part 133b2. In other words, the extension part 133b4 may be provided upwardly inclined with respect to the third part 133b3 not to interfere with the angle of view in the top-bottom direction of the image acquisition part 132c. Similarly, a portion of the cover frame 134b, which covers the extension part 133b4, is provided inclined not to interfere with the angle of view in the top-bottom direction of the image acquisition part 132c.

The third part 133b3 downwardly extends from the extension part 133b4 to protrude outward of the cover frame 134b, and is provided to cover the image acquisition part 132c. The third part 133b3 may downwardly extend in parallel to the second part 133b2 along the side surface of the cleaner body 110.

The suction unit 120 of FIG. 1 will be described in more detail with reference to FIGS. 13-16. When the suction unit 120 has a shape protruding from the cleaner body 110, it is likely that the suction unit 120 will collide with an obstacle unless a separate sensing unit is provided to the suction unit 120. The sensing unit 130 provided to the cleaner body 110 senses an obstacle at the front of the suction unit 120.

When an obstacle exists in a blind spot that the sensing unit 130 does not sense, a physical collision may occur between the autonomous cleaner 100 and the obstacle. When the physical collision occurs, the autonomous cleaner 100 is to move rearward or change a direction so as to avoid further collision with the obstacle. To avoid further collision, it is first required to sense the physical collision between the autonomous cleaner 100 and the obstacle.

The suction unit 120 includes a case 121 and a bumper switch 122 that senses the physical collision. The case 121 forms an appearance of the suction unit 120, and includes an inlet port 120b' that sucks air containing foreign substances, e.g., dust, and the communication part 120b" (air outlet port of the suction unit 120) communicating with the inhalation flow path in the cleaner body 110. At least one portion of the case 121 may have transparency such that the inside of the suction unit 120 may be viewable. The bumper switch 122 may be provided at at least one surface of the case 121. When the bumper switch 122 in contact with an obstacle, the bumper switch 122 is pressurized to transmit a contact signal to the controller. The bumper switch 122 may be also provided to surround the case 121. As illustrated, a front bumper switch 122a is provided at a front side of the case 121, and side bumper switches 122b and 122c are provided at both left and right sides of the case 121, respectively. It is possible to sense not only a physical collision with an obstacle located at the front of the suction unit 120 but also a physical collision of an obstacle located on a side surface of the suction unit 120. The sensing range of a physical collision with an obstacle can be increased.

Referring back to FIG. 2, the side bumper switches 122b and 122c may protrude further than both the sides of the cleaner body 110 in a side direction. In other words, the width of the cleaner head with bumper switches is wider than the width of the cleaner body. When an obstacle is located on a side surface of the autonomous cleaner 100, the side bumper switch 122b or 122c collides with the obstacle earlier than the cleaner body 110, so that the obstacle can be effectively sensed.

The bumper switch 122 includes a bumper 122' and a switch 122". The bumper 122' is a part mounted to the case 121 to be exposed to the outside and movable inwards, and the bumper 122' is pressurized when it is in contact with an obstacle.

An elastic member or elastic spring pressurizes the bumper 122' to the outside. The elastic spring may be provided at the inside of the bumper 122' so that the bumper 122' returns to the original state when the bumper 122' is pressurized by the obstacle. The elastic member may be supported by the bumper 122' and the case 121. The switch 122" is provided at the inside of the bumper 122' to generate an electrical signal by being pressurized when the bumper 122' is moved inward. A micro-switch may be used as the switch 122".

If a contact signal with an obstacle is transmitted through the bumper switch 122, the controller determines that the suction unit 120 has collided with the obstacle to control the driving of the wheel unit 111. For example, the controller may apply a driving force in the opposite direction to the main wheels 111a such that the autonomous cleaner 100 moves rearward. Alternatively, the controller may apply a driving force to only any one of the main wheels 111a or apply a driving force in different directions to both the main wheels 111a such that the autonomous cleaner 100 rotates.

In the above, the bumper switch 122 is configured to be divided into the front bumper switch 122a and the side bumper switches 122b and 122c, but the present disclosure is not limited thereto. The bumper switch 122 may be also formed in a '⊏' shape to cover the front and left and right surfaces of the case 121. In such a case, the bumper switch 122 is configured to be movable to a rear side (when a portion provided at the front surface of the case 121 is in contact with an obstacle), a right side (when a portion provided at the left surface of the case 121 is in contact with an obstacle), and a left side (when a portion provided at the right surface of the case 121 is in contact with an obstacle).

As described above, when a mechanical bumper switch 122 is provided in the suction unit 120, a collision with an obstacle may be directly sensed as compared with when an electronic sensor (e.g., an acceleration sensor, a PSD sensor, etc.) is provided. Further, manufacturing cost can be reduced, and a circuit configuration can be simplified. In addition, an improved function of sensing an obstacle and changing a direction can be implemented by the combination of the bumper switch 122 and the sensing unit 130 provided to the cleaner body 110.

Meanwhile, when the autonomous cleaner is located close to a step, cliff, or a surface having a steep profile, an additional avoidance operation may be required. If an additional sensing of such a situation and control corresponding to the sensing are not provided, the autonomous cleaner may break after falling from the step, or may be unable to recover to climb or drive over the steep surface to perform cleaning again. To this end, the cliff sensor 124 that senses topography thereunder is provided at a front end portion of a lower side of the suction unit 120.

The cliff sensor 124 may be provided with a light emitting part (light emitter) and a light receiving part (light receiver), and measures a distance between the cliff sensor 124 and a floor G by measuring a time for which a beam irradiated onto the floor G from the light emitting part is received to the light receiving part. When a rapidly lowered surface exists at the front, the received time increases rapidly. When a cliff or step exists at the front, the emitted beam is not received by the light receiving part.

In these figures, it is illustrated that an inclined part 120a upwardly inclined with respect to the floor G is formed at the front end portion of the lower side of the suction unit 120, and the cliff sensor 124 is installed at the inclined part 120a to face the floor G. According to the above-described structure, the cliff sensor 124 is provided inclined toward the floor G at a front lower side of the suction unit 120. Therefore, topography the front lower side of the suction unit 120 may be sensed by the cliff sensor 124. Alternatively, the cliff sensor 124 may be provided parallel to the floor G to sense topography immediately under the cliff sensor 124.

If it is sensed through the cliff sensor that the topography under the cliff sensor is lowered to a certain level or lower, the controller controls the driving of the wheel unit 111. For example, the controller may apply a driving force in the opposite direction to the main wheels 111a such that the autonomous cleaner 100 moves rearward in the reverse direction R. Alternatively, the controller may apply a driving force to only any one of the main wheels 111a or apply a driving force in different directions to both the main wheels 111a such that the autonomous cleaner 100 rotates.

The cliff sensor 124 may also be provided at the bottom surface of the cleaner body 110. By considering the function of the cliff sensor 124, a cliff sensor provided to the cleaner body 110 may be provided adjacent to the rear of the cleaner body 110.

For reference, as the inclined part 120a is formed at the front end portion of the lower side of the suction unit 120, the autonomous cleaner 100 can easily climb a low threshold or obstacle. In addition, as shown in these figures, when an auxiliary wheel 123 is provided at the inclined part 120a, the climbing may be more easily performed. For reference, the auxiliary wheel 123 is omitted in FIG. 14 so as to describe the cliff sensor 124.

Because the autonomous cleaner 100 is autonomously driven, it is required to charge the battery 180 provided in the cleaner body 110 to continuously use the autonomous cleaner 100. In order to charge the battery 180, a charging station as a power supply is provided, and a charging terminal 125 configured to be connectable to the charging station is provided in the suction unit 120. In these figures, it is illustrated that the charging terminal 125 is provided at the inclined part 120a to be exposed to the front. The charging terminal 125 may be provided between the cliff sensors 124 which are provided at both sides of the suction unit 120.

Meanwhile, a brush roller 126 may be provided in the suction unit 120 to permit effective suction of dust. The brush roller 126 is rotatable in the inlet port 120b' to sweep foreign substances, e.g., dust and allow the dust to be introduced into the suction unit 120.

By considering the function of the brush roller 126, foreign substances may become stuck to the brush roller 126 over a length of time. Although there are needs for cleaning of the brush roller 126, the suction unit 120 typically has a structure making it difficult to disassemble the suction unit 120, resulting in difficulty to clean the brush roller 126. In the present disclosure, the brush roller 126 can be separated and cleaned easily without entire disassembly of the suction unit 120.

Figure 17:
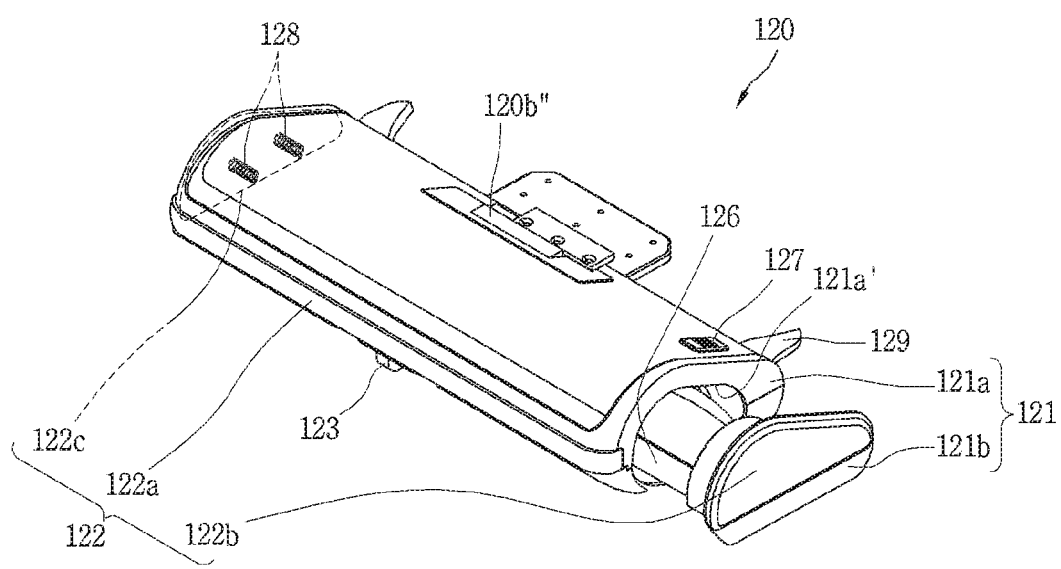
FIG. 17 illustrates a brush roller protruding through a manipulation of a manipulation part in the suction unit shown in FIG. 13.

Referring to FIG. 17, the case 121 includes a main case 121a and a cover case 121b (or inner case). The main case 121a is provided with the rotatable brush roller 126, and an opening 121a' is formed at one side of the main case 121a. The front bumper switch 122a is mounted at a front side of the main case 121a, and any one of the side bumper switches 122b and 122c is mounted at the other side of the main case 121a.

The cover case 121b is detachably coupled to the main case 121a to open/close the opening 121a' provided at the one side of the main case 121a. The other of the side bumper switches 122b and 122c is mounted to the cover case 121b. If the cover case 121b is separated from the main case 121a, the opening 121a' provided at the one side of the main case 121a is exposed to the outside. The brush roller 126 provided in the main case 121a may be exposed to the outside through the opening 121a'.

The manipulation part 127 (lock/unlock switch) through which locking of the cover case part 121b to the main case part 121a is released in manipulation thereof may be provided in the suction unit 120. The manipulation part 127 may be implemented in various types such as a slide type and a press type. In this embodiment, the manipulation part 127 of the slide type is installed at the main case part 121a. An elastic member or elastic spring 128 elastically pressurizes the brush roller 126 inside the other side of the main case 121. A leaf spring, a coil spring, and the like may be used as the elastic member 128.

When the elastic member 128 is pressurized, the brush roller 126 held by the cover case 121b is fastened to the main case 121a. The fastening is released by the manipulation of the manipulation part 127.

Figure 18:
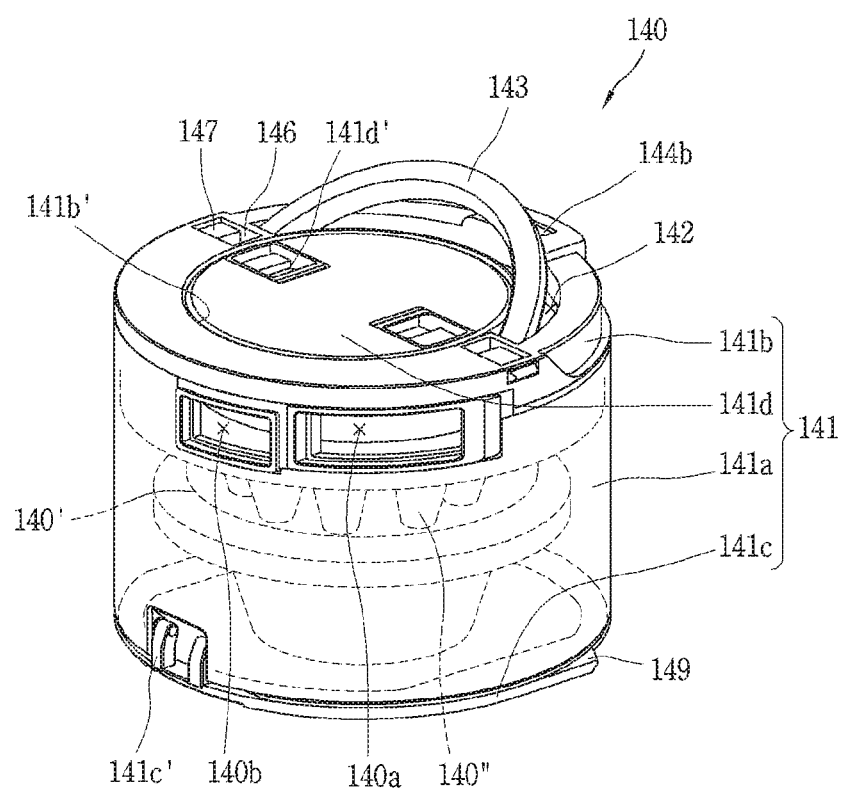
FIG. 18 is a view illustrating a dust container shown in FIG. 1.
Figure 19:
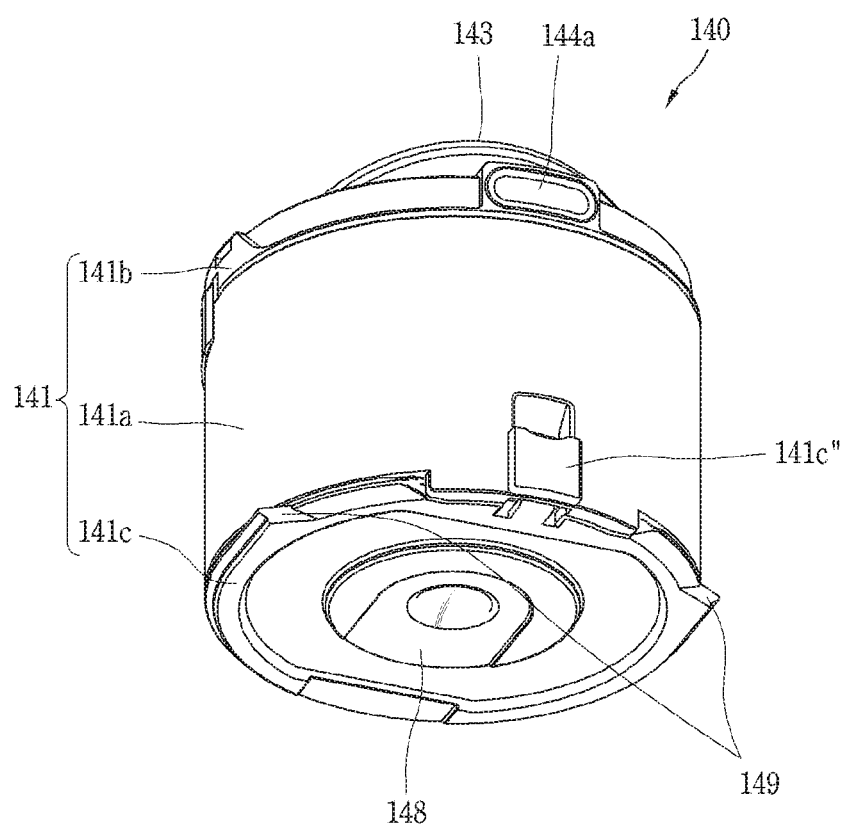
FIG. 19 is a view illustrating a bottom surface of the dust container shown in FIG. 18.
Figure 20:
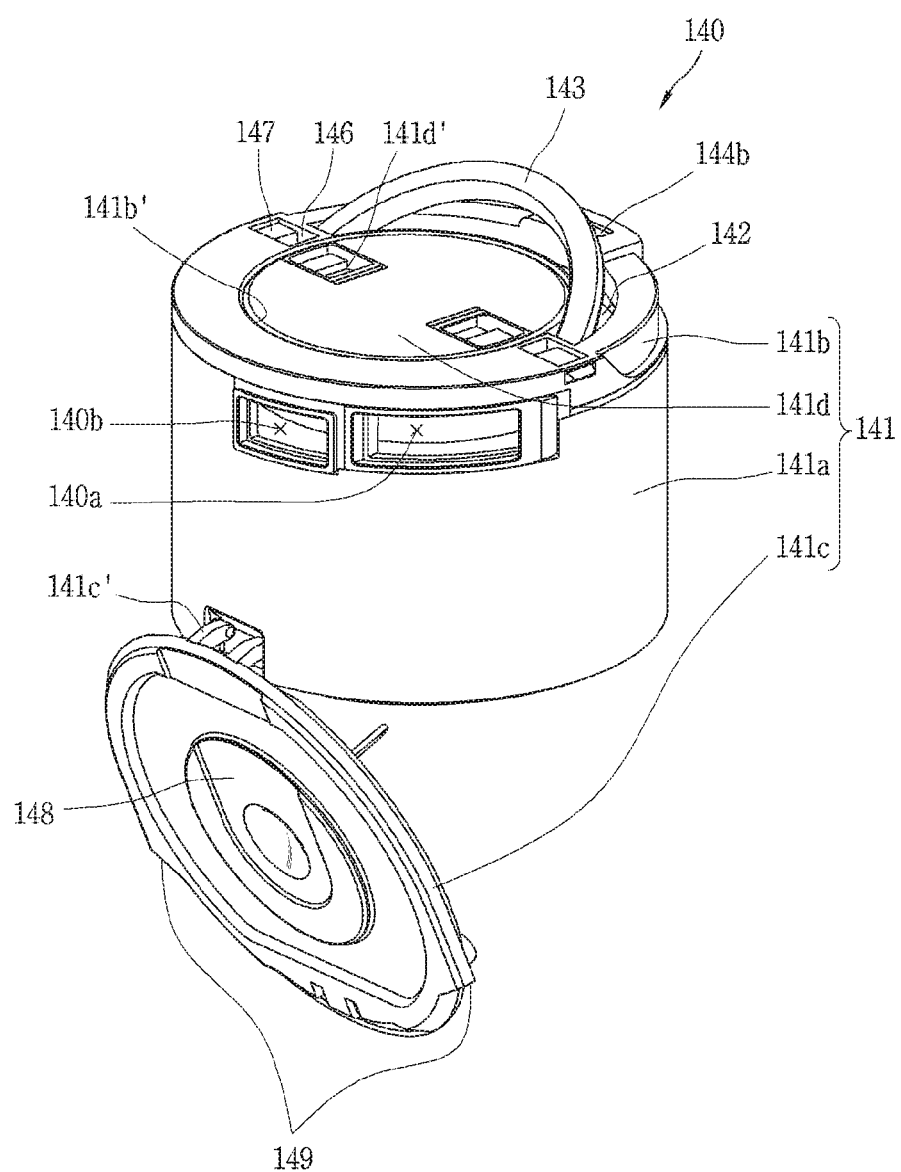
FIG. 20 illustrates a lower case of the dust container shown in FIG. 18 opened.

As illustrated in FIGS. 18-20, the dust container 140 is docked in the dust container accommodation part 113 (or dust container dock) formed at the other side of the cleaner body 110, and is configured to collect dust filtered from sucked air. The dust container 140 may have a in a cylindrical shape, and include a body or external case 141a, an upper case 141b, and a lower case 141c. The upper case 141b is provided to cover an upper portion of the body case 141a, and a lower case 141c is provided to cover a lower portion of the body case 141a.

At least one cyclone may be provided in the body case 141a. For example, a first cyclone 140' filtering dust from air introduced through the entrance 140a and a second cyclone 140" provided in the first cyclone to filter fine dust may be provided in the body case 141a. The second cyclone may be accommodated in an accommodation part 141a" defined by a guide part 141a' which will be described later. The second cyclone may be provided in plurality.

The dust container 140 is provided with the entrance 140a through which air containing dust is introduced into the dust container 140 and the exit 140b through which air from which dust is filtered is exhausted. As illustrated, each of the entrance 140a and the exit 140b is formed in a side surface of the body case 141a. The entrance 140a and the exit 140b may be provided at the same height. The entrance 140a and the exit 140b may be formed adjacent to each other at an upper end of the body case 141a.

Since the dust container 140 is configured to be detachably coupled to the dust container accommodation part 113, a handle 143 may be provided to the dust container 140 such that the dust container 140 may be detached from the dust container accommodation part 113. The handle 143 is hinge-coupled to the upper case 141b to be rotatable. A handle accommodation part 142 (e.g., recess) having the handle 143 accommodated therein is formed in the upper case 141b.

When the dust container cover 150 is coupled to the dust container 140 to cover the dust container 140, the handle 143 may be pressurized by the dust container cover 150 to be accommodated in the handle accommodation part 142. When the dust container cover 150 is separated from the dust container 140, the handle 143 may protrude from the handle accommodation part 142. The upper case 141b may be provided with an elastic part or an elastic spring 143a that elastically pressurizes the handle 143.

The lower case 141c may be rotatably coupled to the body case 141a by a hinge part 141c' (e.g., hinge). A locking member 141c" (e.g., lock) provided to the lower case 141c is detachably coupled to the body case 141a, to allow the lower case 141c to be fixed to the body case 141a when the locking member 141c" is coupled to the body case 141 and to allow the lower case 141c to be rotatable with respect to the body case 141a when the coupling is released. If the lower case 141c is rotated with respect to the body case 141a, dust collected in the dust container 140 is discharged through a lower opening of the dust container 140.

Figure 21:
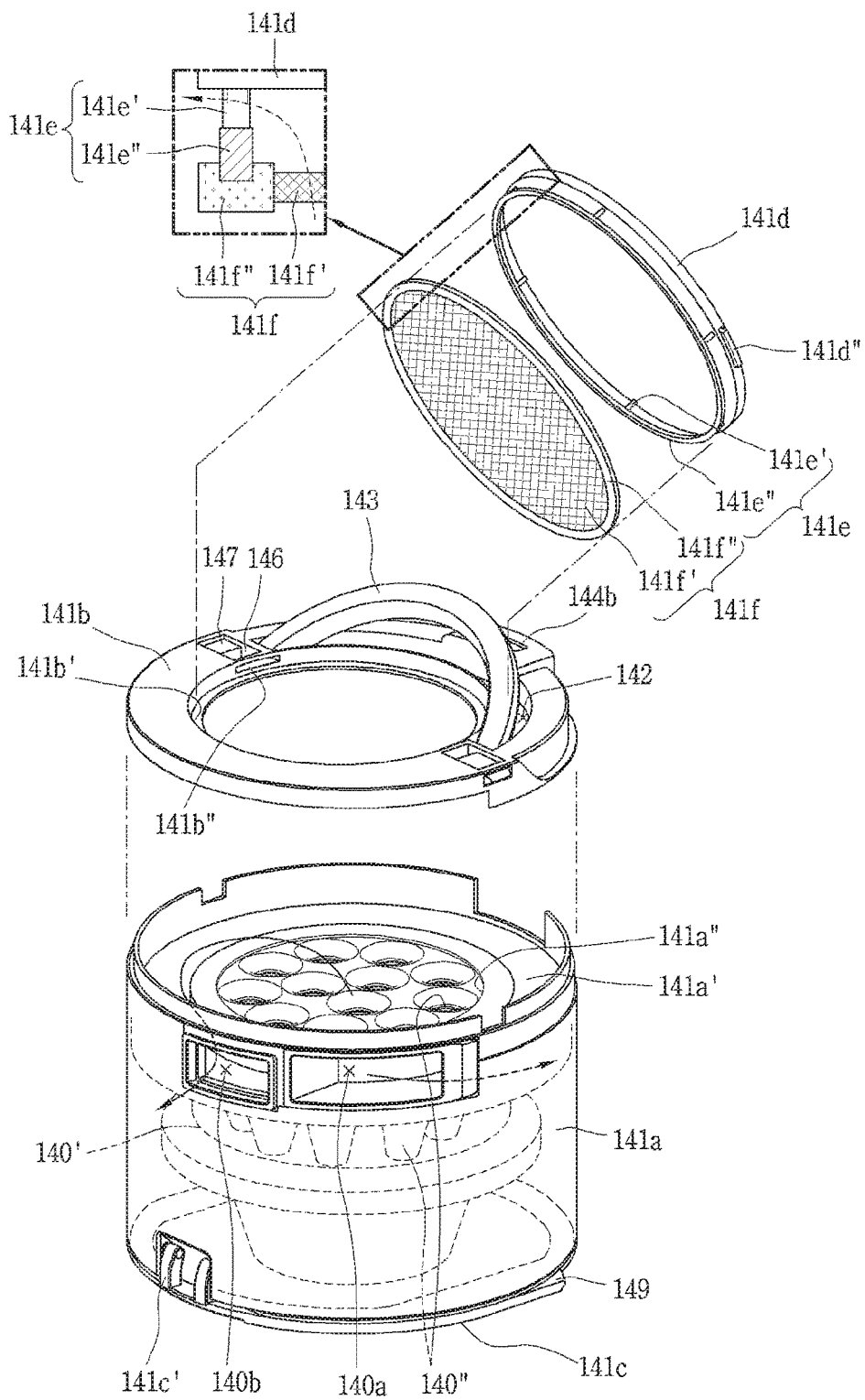
FIG. 21 illustrates an upper case and an upper cover separated from the dust container shown in FIG. 18.

FIG. 21 illustrates the upper case 141b and an upper cover 141d being separated from the dust container 140 shown in FIG. 18. A cyclone provided in the dust container 140 may be omitted for convenience of description.

Referring to FIG. 21 in conjunction with FIG. 18, the upper cover 141d is configured to open/close an upper opening 141b' of the dust container 140. The upper opening 141b' may be formed in the upper case 141b, and the upper cover 141d is detachably coupled to the upper case 141b to open/close the upper opening 141b'. The upper opening 141b' is provided to overlap with the accommodation part 141a" of the body case 141a in which the cyclone is provided.

The upper cover 141d is provided with manipulation parts 141d' (mechanical lock/unlock switch) that allows the upper cover 141d to be fastened to the upper case 141b and allow the fastening to be released. The manipulation parts 141d' may be respectively formed at both left and right sides of the upper cover 141d, to permit pressing in directions opposite to each other, i.e., inward and returning to the original state by an elastic force.

The upper cover 141d is provided with fixing projections 141d" withdrawn or retracted from the outer circumference of the upper cover 141d in linkage with the manipulation of the manipulation part 141d. When the pressing manipulation of the manipulation parts 141d' is performed, the fixing projections 141d" are retracted into accommodation parts formed in the upper cover 141d not to protrude from the outer circumference of the upper cover 141d. If the manipulation parts 141d' are turned to the original state by the elastic force, the fixing projections 141d" protrude from the outer circumference of the upper cover 141d.

A fixing groove 141b" having the fixing projection 141d" inserted and fixed thereinto is formed in an inner surface of the upper case 141b, which forms the upper opening 141b'. The fixing groove 141b" may be formed at a position corresponding to each of the fixing projections 141d", so that the fixing grooves 141b" are opposite to each other. The fixing groove 141b" may be formed in a loop shape to extend along the inner surface of the upper case 141b to allow a greater degree of freedom in installing the fixing projections 141d" increases.

The guide part 141a' is formed to surround the accommodation part 141a" (e.g., opening), and the entrance 140a and exit 140b are formed on surfaces of the guide part 141a', which are opposite to each other. As shown in this figure, the entrance 140a is provided on a bottom surface of the guide part 141a', so that air introduced through the entrance 140a flows at a lower portion of the guide part 141a'. The exit 140b is provided on a top surface of the guide part 141a', so that air discharged toward the exit 140b flows at an upper portion of the guide part 141a'.

The guide part 141a' is formed to block between the entrance 140a and the exit 140b, so that air introduced through the entrance 140a and air discharged toward the exit 140b are separated from each other. The entrance 140a of the dust container 140 may be opened toward the inner circumferential surface such that air introduced into the dust container 140 forms rotational flow. For example, the entrance 140a may be opened to in contact with the inner circumferential surface of the dust container 140. The exit 140b of the dust container 140 may be formed to minimize flow loss and to harmonize with peripheral structures without interruption.

The entrance 140a and the exit 140b may be laterally provided side by side along the circumference of an upper portion of the dust container 140. The entrance 140a and the exit 140b may be formed at the same height on the dust container 140. The entrance 140a is formed at an upper portion of the dust container 140 such that air introduced into the dust container 140 does not scatter the dust collected on the bottom of the dust container 140.

In a cleaner (e.g., an upright type cleaner, a canister type cleaner, etc.) in which the height of a multi-cyclone is less restricted, an exit is typically installed at a position higher than that of an entrance. In the autonomous cleaner 100 of the present disclosure, when the capacity of the dust container 140 is to increase while considering of height restriction, the exit 140b along with the entrance 140a may be formed at the same height on the dust container 140.

In the structure of the present disclosure, in which air introduced through the entrance 140a is guided by the downwardly inclined guide part 141a', an angle at which the air introduced through the entrance 140a flows downward is related to an angle of inclination of the guide part 141a'. If the inclination angle of the guide part 141a' is large, the air introduced through the entrance 140a does not generate a sufficient centrifugal force, and may scatter dust collected on the bottom of the dust container 140.

The inclination of the guide part 141a' may be small. Since the guide part 141a' is continued from an upper side of the entrance 140a to a lower side of the exit 140b, when the entrance 140a and the exit 140b are formed at the same height of the dust container 140, the downward inclination of the guide part 141a' becomes more gradual as the length of the guide part 141a' becomes longer. Accordingly, the guide part 141a' is formed longest when the exit 140b is located immediately next to the entrance 140a. As a result, the guide part 141a has a low inclination angle.

As illustrated, the entrance 140a and the exit 140b are laterally formed side by side at an upper end of the body case 141a. The guide part 140a' may have a downwardly inclined spiral shape along an inner circumferential surface of the body case 141a from an upper end of the entrance 140a to the lower end of the exit 140b.

The cyclone of the dust container 140 is accommodated in the accommodation part 141a" to filter foreign substances or dust in air introduced into the dust container 140 through the entrance 140a. The air having the foreign substances or dust filtered therefrom ascends and flows toward the exit 140b at an upper portion of the guide part 141a'. In the present disclosure, the dust container 140 has a structure in which foreign substances or dust is again filtered before the air is finally discharged through the exit 140b.

A filter 141f that passes through the cyclone and then filters foreign substances or dust in air discharged toward the exit 140b is provided at a rear surface of the upper cover 141d. The filter 141f is provided to cover the second cyclone accommodated in the accommodation part 141a", so that dust in air passing through the second cyclone can be filtered by the filter 141f.

When the upper cover 141d is mounted to the upper case 141b, the filter 141f is provided to cover the accommodation part 141a". For example, the filter 141f may be adhered closely to the top surface of the guide part 141a' or be adhered closely to the inner circumferential surface of the accommodation part 141a".

The filter 141f may be mounted to a mounting rib 141e protruding from the rear surface of the upper cover 141d. The mounting rib 141e may include a plurality of protruding parts 141e' and a mounting part 141e". The mounting rib 141e may be integrally formed with the upper cover 141d by injection molding of the upper cover 141d.

The protruding parts 141e' are formed to protrude from the rear surface of the upper cover 141d, and are provided at a plurality of places, respectively. The mounting part 141e" is provided to be spaced apart from the rear surface of the upper cover 141d at a certain distance, and is supported at a plurality of places by the plurality of protruding parts 141e'. The mounting part 141e" may be formed in a loop shape larger than the accommodation part 141a".

The filter 141f includes a filter part 141f' and a sealing part 141f". The filter part 141f' is provided to cover the accommodation part 141a" to filter foreign substances or dust in air discharged through the exit 140b. The filter part 141f' may have a mesh shape.

The sealing part 141f" is provided to surround the filter part 141f', and is mounted to the mounting part 141e" to allow the filter 141f to be fixed to the mounting rib 141e. In order for the filter 141f to be fixed to the mounting rib 141e, a groove into the mounting part 141e" is inserted may be formed in the sealing part 141f". The sealing part 141f" may be adhered closely to the top surface of the guide part 141a' to surround the accommodation part 141a". Alternatively, the sealing part 141f" may be adhered closely to the inner circumferential surface of the accommodation part 141a".

Air from which foreign substances or dust is filtered by the cyclone is discharged toward the exit 141b through an empty space between the protruding parts 141e' by passing through the filter part 141f'. The empty space is formed at the outer circumference of the filter 141f, and communicates with an upper portion of the guide part 141a'. In addition, the sealing part 141f" is configured to seal a gap between the filter 141f and the top surface of the guide part 141a' adhered closely to the filter 141f or the inner circumferential surface of the accommodation part 141a", so that it is possible to prevent foreign substances or dust in air from being discharged toward the exit 141b through the gap.

Figure 22:
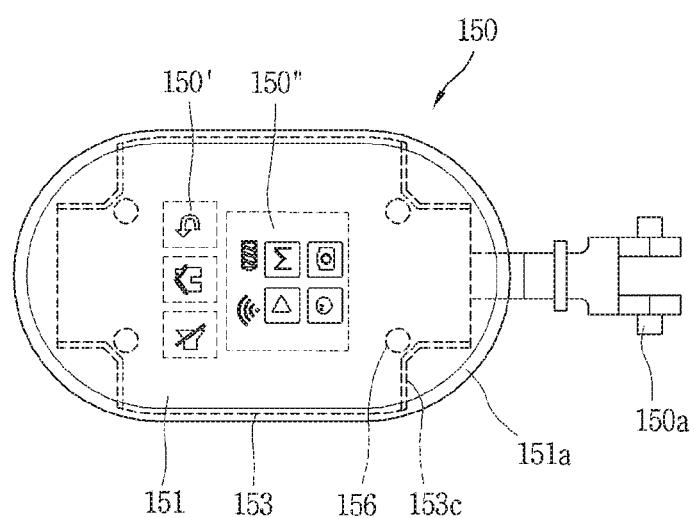
FIG. 22 is a view illustrating a dust container cover shown in FIG. 1.
Figure 23:
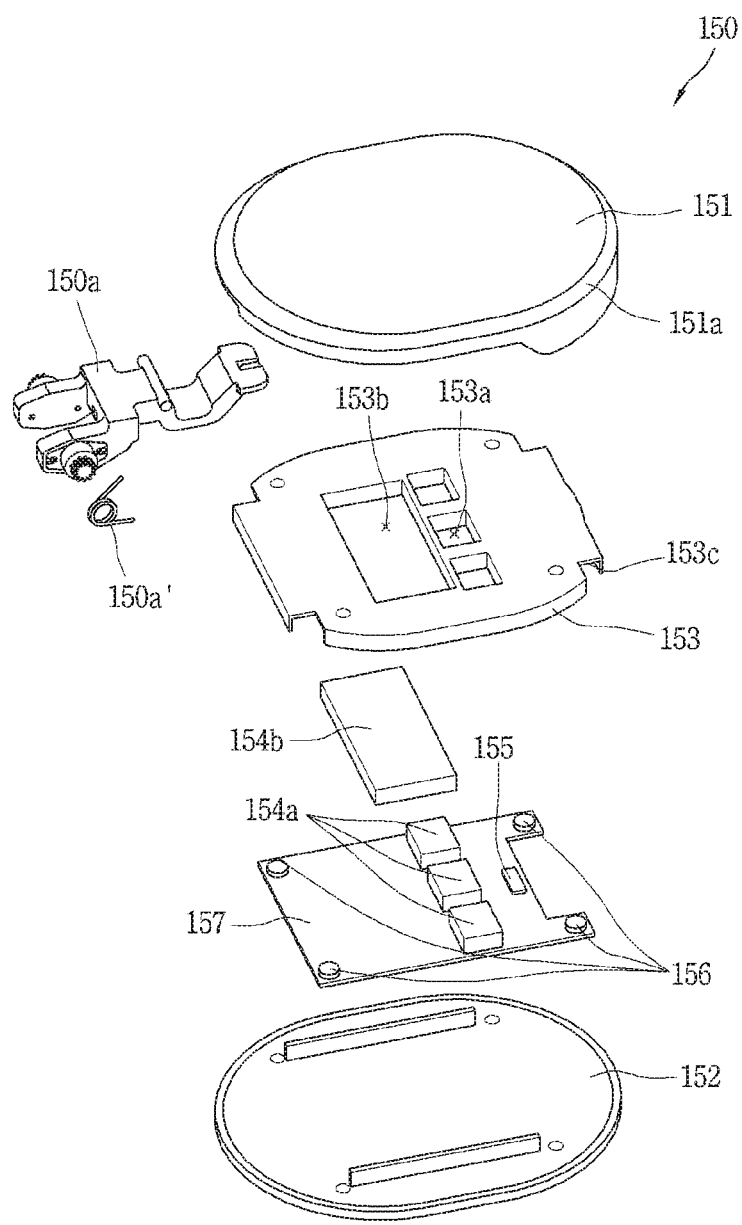
FIG. 23 is an exploded perspective view of the dust container cover shown in FIG. 22.

Referring to FIGS. 22 and 23 in conjunction with FIGS. 1 to 3, the dust container cover 150 is rotatably coupled to the cleaner body 110 by a hinge 150a, and is provided to completely cover a top surface of the dust container 140 when the dust container cover 150 is coupled to the dust container 140. In this state, a portion of the dust container cover 150 is accommodated in at the dust container accommodation part 113, and the other portion of the dust container cover 150 may be formed to protrude toward the rear of the cleaner body 110 (i.e., in the reverse direction R opposite to the forward direction F). The hinge 150a is configured to elastically pressurize (e.g., due to an elastic part or an elastic spring 150a') the dust container cover 150 in the upper direction. When the dust container cover 150 is not coupled to the dust container 140, the dust container cover 150 may be tilted upwardly inclined with respect to the top surface of the dust container 140.

The dust container cover 150 may be formed in an elliptical shape in the front-rear direction of the cleaner body 110 to completely cover the circular dust container 140 when the dust container cover 150 is coupled to the dust container 140. A recessed part 116 dented from the top surface of the cleaner body 110 is formed along the outer circumference of the dust container accommodation part 113 in the cleaner body 110 (see FIGS. 24 and 29). The dust container cover 150 is accommodated in the dust container accommodation part 113 through rotation thereof. The dust container cover 150 is provided to simultaneously cover the top surface of the dust container and the recessed part 116. A front-rear length of the dust container cover 150 corresponding to the front-rear direction of the cleaner body 110 may be formed longer than a left-right length of the dust container cover 150 corresponding to the left-right direction of the cleaner body 110. The left-right direction is formed equal to or longer than a radius of the dust container cover 150.

The dust container cover 150 may be provided with at least one of a touch key 150', a touch screen 150'', and a display (not shown). The touch screen 150'' may be distinguished from the display that outputs visual information but has no touch function, in that the touch screen 150'' outputs visual information and receives a touch input to the visual information. The dust container cover 150 may include a top cover 151, a bottom cover 152, and a middle frame 153 between the top cover 151 and the bottom cover 152. The components may be formed of a synthetic resin material.

The top cover 151 may be configured to have a certain amount of transparency. For example, the top cover may be translucent. Alternatively, the top cover itself may be transparent, and a film attached to a rear surface of the top cover 151 may be translucent. As the top cover 151 has the transparency, a pictogram of the touch key 150' or visual information output from the touch screen 150'' or the display may be transmitted to a user through the top cover 151.

A touch sensor that senses a touch input to the top cover 151 may be attached to the rear surface of the top cover 151. The touch sensor may constitute a touch key module 154a and/or a touch screen module 154b, which will be described later.

The bottom cover 152 is coupled to the top cover 151, so that the top cover 151 and the bottom cover 152 form an appearance of the dust container cover 150. The bottom cover 152 may be formed of an opaque material, and form a mounting surface on which electronic devices or a sub-circuit board 151 can be mounted in the dust container cover 150.

The hinge 150a rotatably coupled to the cleaner body 110 may be coupled to the top cover 151 or the bottom cover 152. The hinge part 150a may be provided in the top cover 151 or the bottom cover 152.

The electronic devices or the sub-circuit board 157 may be mounted on the bottom cover 152. For example, the sub-circuit board 157 electrically connected to a main circuit board of the cleaner body 110 may be mounted on the bottom cover 152. The main circuit board may be configured as an example of the controller for operating various functions of the autonomous cleaner 100.

Various electronic devices are mounted on the sub-circuit board 157. In FIG. 23, the touch key module 154a, the touch screen module 154b, and infrared receiving units 156 (e.g., IR sensors) are electrically connected on the sub-circuit board 157. The electrical connection includes not only that the electronic devices are mounted on the sub-circuit board 157 but also that the electronic devices are connected to the sub-circuit board 157 through a flexible printed circuit board (FPCB).

A pictogram may be printed on the top cover above the touch key module 154a, and the touch key module 154a is configured to sense a touch input to the pictogram of the top cover 151. The touch key module 154a may include a touch sensor, and the touch sensor may be provided to be attached or adjacent to the rear surface of the top cover 151. The touch key module 154a may further include a backlight unit that lights the pictogram.

The touch screen module 154b provides an output interface between the autonomous cleaner 100 and the user through the output of visual information. Simultaneously, the touch screen module 154b senses a touch input to the top cover 151 to provide an input interface between the autonomous cleaner 100 and the user. The touch screen module 154b includes a display that outputs visual information through the top cover 151 and a touch sensor that senses a touch input to the top cover 151, and the display and the touch sensor form a mutual-layered structure or is integrally formed, thereby implementing a touch screen.

The touch screen module 154b may be accommodated in a through-hole 153b of the middle frame 153 to be coupled to the middle frame 153 through bonding, hook-coupling, or the like. In this case, the touch screen module 154b may be electrically connected to the sub-circuit board 157 through the FPCB. The touch screen module 154b may be attached to or provided adjacent to the rear surface of the top cover 151.

The dust container cover 150 may be provided with an acceleration sensor 155. The acceleration sensor 155 may be mounted on the sub-circuit board 157 or be electrically connected to the sub-circuit board 157 through the FPCB. The acceleration sensor 155 senses a gravitational acceleration acting on the acceleration sensor 155, which is divided into X, Y, and Z vectors perpendicular to one another.

The controller may sense whether the dust container cover 150 has been opened/closed, using X, Y, and Z vector values sensed by the acceleration sensor 155. Specifically, based on a state in which the dust container cover 150 is closed, at least two vector values are changed in a state in which the dust container cover 150 is opened (tilted). That is, the vector values sensed through the acceleration sensor 155 are changed depending on a degree to which the dust container cover 150 is inclined.

When a difference between vector values in the two states is equal to or greater than a preset reference value, the controller may determine that the dust container cover 150 has not been coupled to the dust container 140, to generate a corresponding control signal. For example, if the dust container cover 150 is in a tilted state as it is opened, the controller 190 may senses the tilted state to stop the driving of wheel unit 111 and generate an alarm.

In addition, if vibration is applied to the dust container cover 150, vector values sensed through the acceleration sensor 155 are changed. When a difference between the vector values, which is equal to or greater than the preset reference value, is sensed within a certain time, the state of the touch screen module 154b may be changed from a non-activation (OFF) state to an activation (ON) state. For example, if the user taps the dust container cover 150 plural times in a state in which the touch screen module 154b is not activated, the controller may sense the tapping of the user through the acceleration sensor 155 to change the state of the touch screen module 154b from the non-activation state to the active state.

A gyro sensor may be used instead of the acceleration sensor 155. The acceleration sensor 155 and the gyro sensor may be used together, so that improved sensing performance can be implemented through complementary detection.

The infrared receiving units 156 may be provided at corner portions of the sub-circuit board 157 to receive infrared signals transmitted from directions different from one another. Here, the infrared signal may be a signal output from a remote controller (not shown) for controlling the autonomous cleaner 100 in manipulation of the remote controller.

The middle frame 153 is provided to cover the sub-circuit board 157, and has through-holes 153a and 153b respectively corresponding to the touch key module 154a and the touch screen module 154b, which are mounted on the sub-circuit board 157. Inner surfaces defining the through-holes 153a and 153b are formed to surround the touch key module 154a and a touch screen module 154b, respectively.

An accommodation part 153c that is provided to cover an upper portion of each of the infrared receiving units 156 and has an opened front to receive infrared light may be provided at each corner portion of the middle frame 153. According to the above-described disposal, the infrared receiving unit 156 is provided to face a side surface of the dust container cover 150 (specifically, a side surface of the top cover 151 having transparency). Since the upper portion of the infrared receiving unit 156 is covered by the accommodation part 153c, it is possible to prevent a malfunction of the infrared receiving unit 156, caused by a three-wavelength lamp provided on a ceiling or sunlight.

At least one portion of the dust container cover 150 may be provided to protrude further than the top surface of the cleaner body 110. As shown in these figure, the top cover 151 may be provided with a tapered part 151a extending downwardly inclined to the outside from a top surface thereof. The tapered part 151a may be formed to extend along the outer circumference of the top cover 151, and be located to protrude further than the top surface of the cleaner body 110 in the state in which the dust container cover 150 is coupled to the dust container 140 as shown in FIG. 3.

If a side surface vertically downwardly extending from the top surface of the top cover 151 is continuously formed, an infrared signal introduced into the top cover 151 at a corner portion of the top cover 151 is refracted or reflected, and therefore, the receiving performance of the infrared receiving unit 156 may be deteriorated. Further, if the side surface of the top cover 151 is completely covered by the top surface of the cleaner body 110, the receiving performance of the infrared receiving unit 156 may further deteriorate.

However, according to the above-described structure, an infrared signal introduced into the top cover 151 can be introduced into the infrared receiving unit 156 provided adjacent to the inside of the tapered part 151a without being almost refracted or reflected by the tapered part 151a. In addition, as the tapered part 151a is located to protrude further than the top surface of the cleaner body 110, and the infrared receiving unit 156 is provided in plural numbers to be spaced apart from each other at a certain distance inside the tapered part 151a, infrared signals can be received in all directions. Thus, the receiving performance of the infrared receiving unit 156 may be improved.

Figure 24:
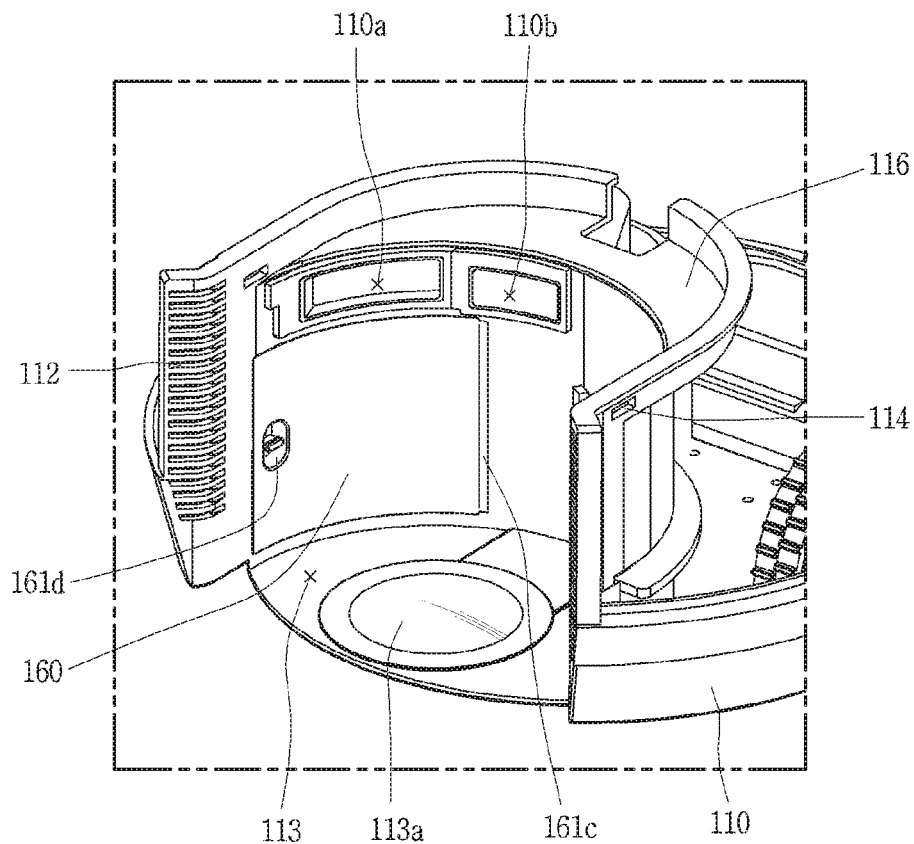
FIG. 24 is a view illustrating a cleaner body from which the dust container is separated in the autonomous cleaner shown in FIG. 1.

Referring to FIG. 24 in conjunction with FIG. 19, the first opening 110a and the second opening 110b are provided in the inner wall of the dust container accommodation part 113. The first opening 110a and the second opening 110b may be provided at the same height. Each of the first opening 110a and the second opening 110b may be formed along the inner circumference at an upper end of the inner wall of the dust container accommodation part 113.

In order to connect the dust container 140 to the intake flow path and the exhaust flow path in the cleaner body 110, the first and second openings 110a and 110b are to communicate with the entrance 140a and the exit 140b of the dust container 140, respectively. It may be important that the dust container 140 should be mounted and fixed at a regular or normal position.

A mounting guide 113a is formed to protrude from a bottom surface of the dust container accommodation part 113, and a mounting groove 148 corresponding to the mounting guide 113a is formed at a bottom surface portion of the dust container 140. As the mounting groove 148 is provided to cover the mounting guide 113a (e.g., as the mounting guide 113a is provided into the mounting groove 148), the dust container 140 may be aligned to the dust container accommodation part 113.

The dust container 140 formed in a cylindrical shape may rotate when docked in the dust container accommodation part 113 having a rounded shape. In order to prevent the rotation of the dust container 140, fixing projections 149 respectively protrude at both sides of the dust container 140 to cover at least one portion of the inner wall of the dust container accommodation part 113.

The fixing projections 149 are formed to protrude at both sides of the lower case 141c. The fixing projections 149 may be formed at the body case 141a or the upper case 141b. The fixing projections 149 are provided to fill in a gap between the dust container accommodation part 113 and the dust container 140. Although a rotational force may be applied to the dust container 140, the rotation of the dust container 140 can be restricted as the fixing projections 149 are inserted into the dust container accommodation part 113.

Figure 25:
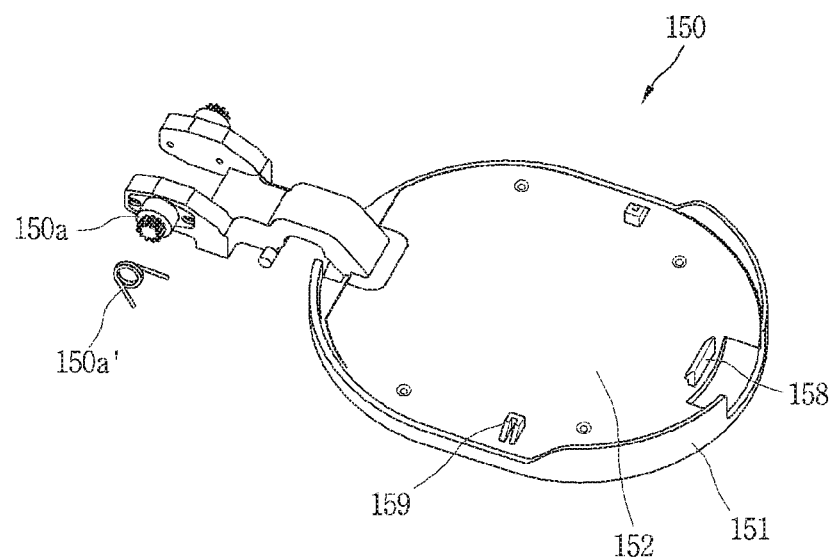
FIG. 25 is a view illustrating a rear surface of the dust container cover shown in FIG. 22.
Figure 26:
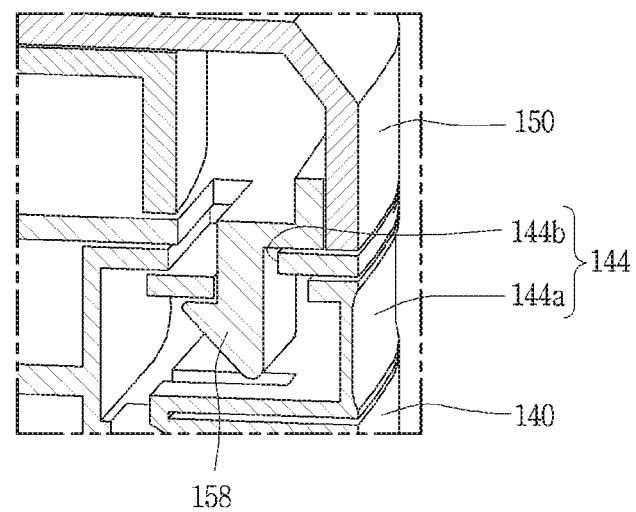
FIG. 26 is a sectional view illustrating a structure in which a hook part shown in FIG. 25 is fastened to the dust container.

In addition to the fixing structure, the autonomous cleaner 100 of the present disclosure has a structure in which the dust container 140 and the cleaner body 110 are fastened to each other as the dust container 140 and the dust container cover 150 are fastened to each other. Referring to FIGS. 25 and 26 in conjunction with FIG. 19, the dust container cover 150 is provided with the hook 158 configured to be fastened to a locking part 144 of the dust container 140. The hook 158 may be formed to protrude at one side of the bottom surface of the bottom cover 152. The hook 158 may be provided at the opposite side of the hinge 150a.

When the hook 158 is fastened to the locking 144, the handle 143 provided at an upper portion of the dust container 140 is pressurized by the dust container cover 150 to be accommodated in the handle accommodation part 142. If the fastening between the hook 158 and the locking part 144 is released, the handle 143 is forced by the elastic member 143a to protrude from the handle accommodation part 142. As described above, the handle 143 may be provided inclined with respect to the upper case 141b.

The locking part 144 provided in the dust container 140 includes a button part 144a and a holding part 144b. The locking part 144 is exposed to the rear of the cleaner body 110. The button part 144a is provided at a side surface of the dust container 140 to permit pressing manipulation, and the holding part 146b is configured such that the hook 158 of the dust container cover 150 can be locked thereto. Also, the holding part 146b is configured such that the locking of the holding part 146b to the hook part 158 is released in the pressing manipulation of the button part 144a. The holding part 144b may be formed at an upper portion of the dust container 140.

In the above, the case where the hook part 158 is provided in the dust container cover 150 and the locking part 144 is provided in the dust container 140 has been described as an example, but formation positions of the hook part 158 and the locking part 144 may be changed from each other. In other words, the locking part may be provided in the dust container cover 150 and the hook part may be provided in the dust container 140.

Figure 27:
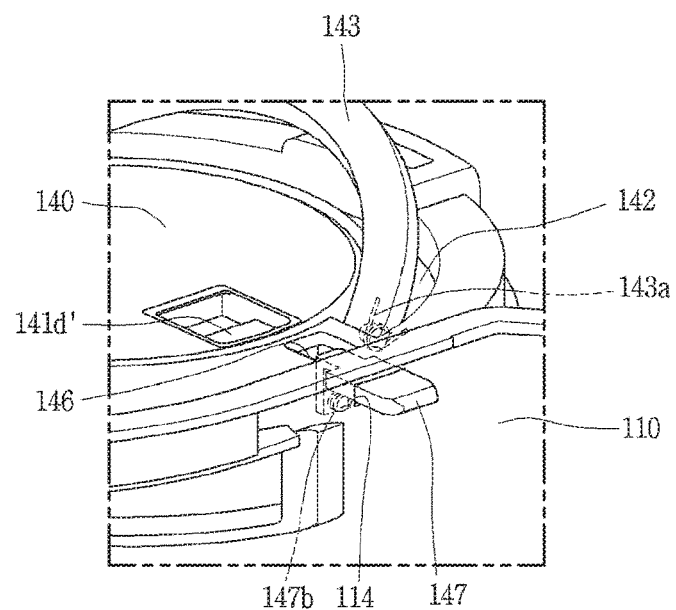
FIGS. 27 and 28 illustrate a structure in which the dust container is fastened to the cleaner body by a pressurizing projection shown in FIG. 25.
Figure 28:
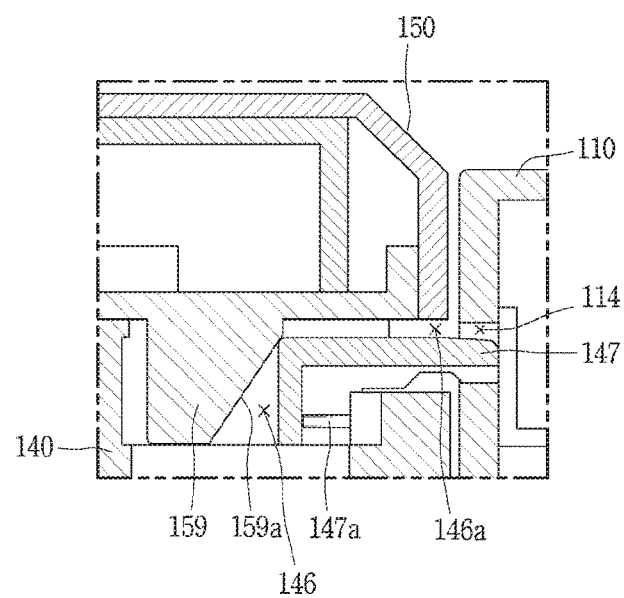

A structure in which the dust container 140 is fastened to the cleaner body 110 will be described with reference to FIGS. 27 and 28. A fixing part 114 into which a portion of a fixing hook 147 which will be described later is inserted may be provided in an inner wall that defines the dust container accommodation part 113. The fixing part 114 may have the shape of a groove or hole, and be provided at both left and right sides of the dust container accommodation part 113.

The dust container 140 is provided with an accommodation part 146 and the fixing hook 147. The accommodation part 146 is formed recessed in the top surface of the dust container 140, and has a side hole 146a opened in a lateral side. The accommodation part 146 is formed at both left and right sides of the upper case 141b.

The dust container 140 is mounted at the regular position of the dust container accommodation part 113, the side hole 146a is provided to face the fixing part 114. The above-described structure of the mounting guide 113a and the mounting groove 148, and the fixing projection 149 may be used when the dust container 140 is mounted at the regular position of the dust container accommodation part 113.

The fixing hook 147 is mounted in the accommodation part 146 to be movable in the lateral direction. If the fixing hook 147 is pressurized to the outside, the fixing hook 147 is moved to the outside and then moved to the inside by an elastic part or an elastic spring 147b to be placed at the original position. At this time, the fixing hook 147 is configured to protrude to the outside of the dust container 140 through the side hole 146a.

A pressurizing projection 159 inserted into the accommodation part 146 when the dust container cover 150 is fastened to the dust container 140 is formed to protrude from the rear surface of the dust container cover 150. The above-described structure of the hook part 158 and the locking part 144 may be used when the dust container cover 150 is fastened to the dust container 140.

The pressurizing projection 159 is configured to pressurize the fixing hook 147 to the outside when the pressurizing projection 159 is inserted into the accommodation part 146. To this end, a portion of the pressurizing projection 159, which faces the fixing hook 147 when the pressurizing projection 159 is inserted into the accommodation part 146, may form a tapered inclined part 159a.

When the pressurizing projection 159 of the dust container cover 150 is inserted into the accommodation part 146, the fixing hook 147 protrudes to the outside of the dust container 140 through the side hole 146a to be inserted into the fixing part 114 opposite thereto. The dust container 140 can be fastened to the cleaner body 110.

The above-described structure is characterized in that the fastening between the dust container 140 and the cleaner body 110 is simultaneously performed by the fastening between the dust container 140 and the dust container cover 150. The fastening or locking between the dust container 140 and the cleaner body 110 may be simultaneously released as the fastening between the dust container 140 and the dust container cover 150 is released, so that the dust container 140 may be separated from the cleaner body 110.

The dust container cover 150 may be rotatably coupled to the cleaner body 110 through the hinge part 150a. In this case, the dust container cover 150 is detachably coupled to the dust container 140 by the structure of the hook part 158 and the locking part 144. In addition, if the dust container cover 150 is fastened to the dust container 140, the fastening between the dust container 140 and the cleaner body 110 is performed.

The dust container 140 may be fastened to each of the dust container cover 150 and the cleaner body 110. When the dust container 140 is not mounted, the dust container cover 150 is in a state in which it is freely rotatable about the hinge part 150a in the cleaner body 110, i.e., in a non-fixed state. As described above, in this non-fixed state, the dust container cover 150 may be provided to be tilted by the hinge part 150a that provides an elastic pressurizing force to an upper side thereof.

A switch 147a for sensing whether the dust container cover 150 has been fastened to the dust container 140 may be provided inside the fixing hook 147. If the fixing hook 147 is moved to the outside, the switch 147a is pressurized to generate a signal. The controller may sense whether the dust container cover 150 has been fastened to the dust container 140, based on the signal transmitted by the switch 147a. A micro-switch known in the art may be used as the switch 147a.

If the dust container 140 is not mounted, the dust container cover is not closed because of the coupling relation of the dust container cover 150, the dust container 140, and the cleaner body 110. The user may check a state of the dust container cover 150 with the naked eye, without the switch 147a, to intuitively check whether the dust container cover 150 has been fastened to the dust container 140.

Figure 29:
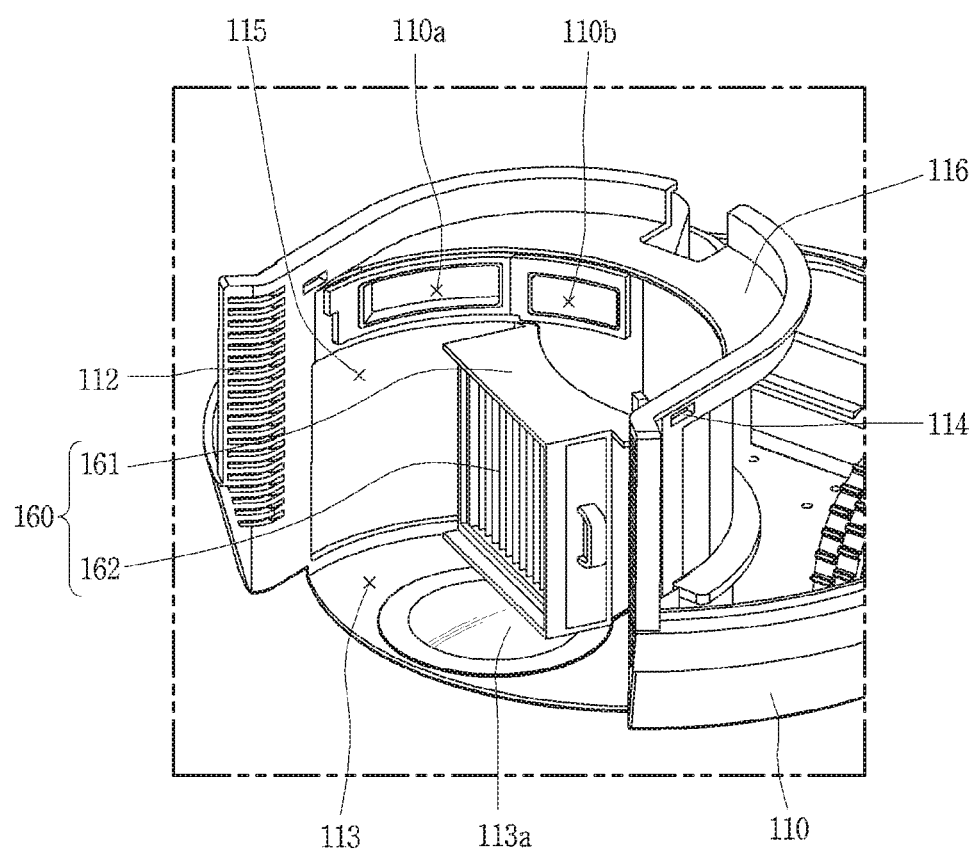
FIG. 29 illustrates a state in which a filter unit shown in FIG. 24 is rotated.
Figure 30:
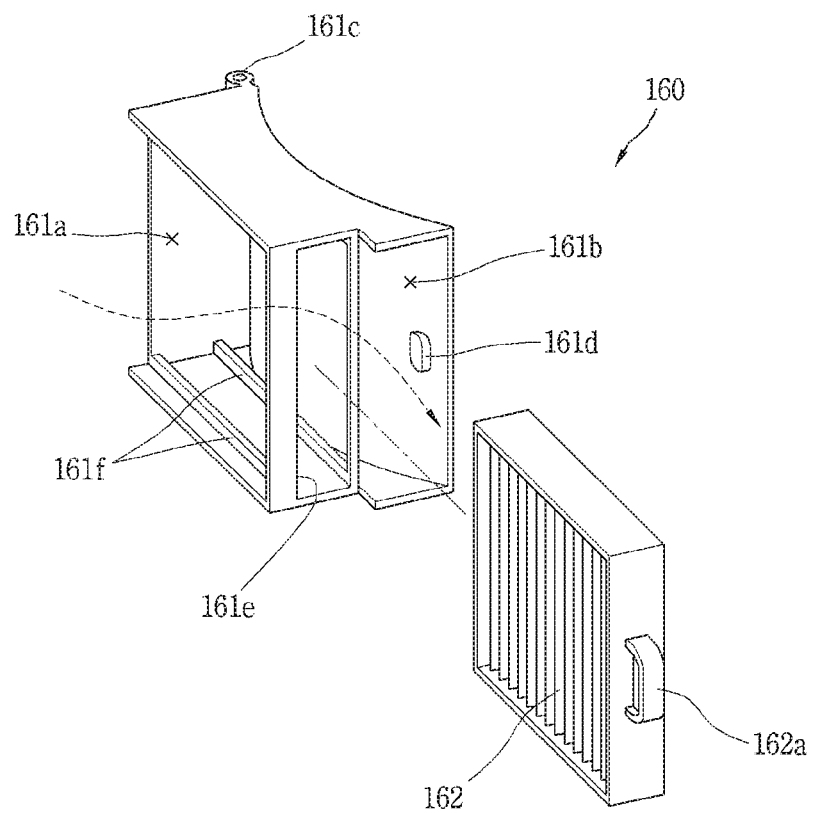
FIG. 30 is an exploded perspective view of the filter unit shown in FIG. 29.

Meanwhile, air filtered in the dust container 140 is discharged from the dust container 140 and finally discharged to the outside through the exhaust port 112. Here, a filter unit 160 that filters fine dust contained the filtered air is provided at the front of the exhaust port. Referring to FIGS. 29 and 30 in conjunction with FIG. 24, the filter unit 160 is accommodated in the cleaner body 110, and is provided at the front of the exhaust port 112. The filter unit 160 is exposed to the outside when the dust container 140 is separated from the dust container accommodation part 113. The exhaust port 112 may be formed in an inner wall of the cleaner body 110 that defines the dust container accommodation part 113. The exhaust port 112 may be formed at one (left or right) end portion of the cleaner body 110 that surrounds the dust container accommodation part 113. In FIG. 29, it is illustrated that the exhaust port 112 is formed long along the height direction of the cleaner body 110 at the left end portion of the dust container accommodation part 113 on the drawing.

Air discharged from the second opening 110b is guided to the exhaust port 112 through the exhaust flow path. In the structure in which the exhaust port 112 is formed at the one end portion of the cleaner body 110, the exhaust flow path extends to the one end of the cleaner body 100. The filter unit 160 is provided on the exhaust flow path.

The filter unit 160 includes a filter case 161 and a filter 162. The filter case 161 is provided with a hinge part 161c hinge-coupled to the inner wall of the cleaner body 110 that defines the dust container accommodation part 113. The filter case 161 is configured to be rotatable with respect to the cleaner body 110.

The filter case 161 includes a filter accommodation part 161a (filter housing) and a ventilation port 161b that communicates with the filter accommodation part 161a and is provided to face the exhaust port 112. Air introduced into the filter case 161 is discharged to the ventilation port 161b via the filter 162 mounted in the filter accommodation part 161a.

The filter 162 is mounted in the filter accommodation part 161a. A HEPA filter for filtering fine dust may be used as the filter 162. A handle 162a may be provided to the filter 162.

In FIG. 30, it is illustrated that the filter accommodation part 161a is formed at a front surface of the filter case 161, and the ventilation port 161b is formed in a side surface of the filter case 161. More specifically, a through-hole 161e is formed in the side surface of the filter case 161, and a guide rail 161f protrudes along the insertion direction of the filter 162 on a bottom surface of the filter case 161 to guide the insertion of the filter 162 through the through-hole 161e.

The structure in which the filter 162 is mounted in the filter case 161 is not limited thereto. As another example, unlike the structure shown in FIG. 30, the filter 162 may be mounted at a front surface of the filter case 161 to be accommodated in the filter accommodation part 161*a*. In this case, the filter 162 may be fixed to the filter accommodation part 161*a* through hook coupling.

The filter case 161 may be received in the cleaner body 110 through an opening 115 formed in the inner wall of the cleaner body 110, and an outer surface of the filter case 161 is exposed to the outside in the state in which the filter case 161 is received in the cleaner body 110 to define the dust container accommodation part 113 together with the inner wall of the cleaner body 110. To this end, the outer surface of the filter case 161 may have a rounded shape, and be preferably formed as a curved surface having the substantially same curvature as the inner wall of the dust container accommodation part 113.

A knob 161*d* may be formed on one surface of the filter case 161 that defines the dust container accommodation part 113 together with the inner wall of the cleaner body 110. Referring to FIGS. 2 and 24, when the dust container 140 is accommodated in the dust container accommodation part 113, the dust container 140 is configured to cover the filter case 161, and the knob 161*d* is not exposed to the outside as the dust container 140 covers the knob 161*d*.

The filter case 161 may be provided in the dust container accommodation part 113 in a state in which the filter case 161 is rotated to open the opening 115. According to the above-described structure, the filter accommodation part 161*a* is exposed to the outside, so that the filter 162 can be easily replaced.

An aspect of the detailed description is to provide a new sensing unit capable of minimizing a sensing part, implementing a front monitoring/photographing function, a simultaneously localization and mapping function, and an obstacle sensing function, and improving obstacle sensing performance.

Another aspect of the detailed description is to provide a suction unit capable of more directly sensing a collision with an obstacle by complementing the sensing unit, and sensing in advance a step or cliff that is rapidly lowered when the step or cliff exist at the front thereof.

Still another aspect of the detailed description is to provide a structure capable of improving assembly convenience of a cleaner body, a dust container, and a dust container cover.

Still another aspect of the detailed description is to provide a structure in which a filter for filtering fine dust can be easily replaced.

An autonomous cleaner according to the present disclosure may include a controller to control an operation of the autonomous cleaner; a cleaner body having a dust container dock formed as a recess, the recess being opened toward a top and rear of cleaner body; a plurality of wheels and at least one first motor to rotate at least one of the plurality of wheels, the controller controlling the motor to control a travel direction of the cleaner body; a cleaner head attached to the cleaner body; a dust container provided in the recess of the cleaner body, the dust container collecting foreign substances filtered from air suctioned through the cleaner head; and a cover movable between an open position to reveal a top surface to the dust container and a close position to cover the top surface of the dust container, wherein the cover is configured to apply a load against a bolt of a lock provided at the dust container and the bolt is configured to move into a bolt receptacle provided at a wall of recess when the cover is in the closed position.

The top surface of the dust container includes a top recess having a side hole, and the bolt is movable in the top recess to protruded through the side hole in a lateral direction by the load for insertion into the bolt receptacle. A projection protrudes from a rear surface of the cover, and is inserted into the top recess to force the bolt to protrude through the side hole when the cover is moved to the closed position. A surface of the projection contacting the bolt is tapered to slide the bolt through the side hole when the cover is closed to cover the top surface of the dust container. The bolt is spring loaded such that when there is an absence of the load in the open position of the cover, the bolt is retracted into the side hole of the top recess, and the dust container is removable from the dust container dock.

A hinge couples the cover to the cleaner body and the hinge is spring loaded such that cover returns to the open position, where the cover is upwardly inclined upon release of the cover from the closed position. At least one of an acceleration sensor or a gyro sensor in the cover is used by the controller to determine the open or closed position of the cover to pause or stop the driving of the at least one wheel upon detection that the cover has been opened.

The dust container includes: a handle recess formed in the top surface of the dust container; a handle hinge-coupled to the handle recess to be rotatable, the handle being configured to fit into the handle recess; and an elastic spring to return the handle to protrude at an inclined angle relative to the top surface when the cover moves to the open position.

The dust container cover is provided with a hook configured to be fastened to a lock of the dust container, and when the hook is fastened to the lock, the elastic spring is forced by the cover to allow the handle to fit into the handle recess. The dust container is formed in a cylindrical shape, and the dust container dock has a rounded shape corresponding to the dust container, and wherein a fixing projection provided to cover at least one portion of an inner wall of the dust container dock is formed to protrude from both sides of the dust container.

A portion of the dust container and a portion of the cover are provided to protrude from the rear of the cleaner body. A first cyclone and a second cyclone are provided in the dust container, the first cyclone filtering dust from sucked air, and the second cyclone provided in the first cyclone filtering fine dust. The entire second cyclone is provided in the first cyclone. A filter filtering foreign substances or dust in air that passes through the second cyclone and is then discharged toward an exit is further provided in the dust container.

The present disclosure has various advantageous.

First, the first sensing part is provided inclined with respect to one surface of the cleaner body to simultaneously photograph front and upper parts, and the controller divides a photographed image into front and upper images according to objects different from each other. Thus, the first sensing part can be more efficiently used, and the existing sensing parts provided for every object can be integrated as one.

Also, the second sensing part of the sensing unit includes the first and second pattern irradiating parts that respectively irradiate beams having first and second patterns toward a front lower side and a front upper side, and the image acquisition part that photographs the beams having the first and second patterns, so that a front geographic feature and an upper obstacle can be sensed together. As a result, the obstacle avoidance performance of the autonomous cleaner can be improved.

In addition, the first sensing part and the second sensing part are integrated to constitute one module called as the sensing unit, so that it is possible to provide a autonomous cleaner having a new form factor.

Second, the bumper switch that mechanically operates is provided in the suction unit provided to protrude from one side of the cleaner body, so that, when the suction unit collides with an obstacle, the collision can be directly sensed. In addition, side bumper switches respectively provided at both sides of the suction unit are provided to protrude in a lateral direction instead of both sides of the cleaner body, so that the collision with an obstacle in the lateral direction can be effectively sensed.

If the bumper switches are combined with the sensing unit, more improved obstacle sensing and a direction changing function corresponding thereto can be realized.

In addition, the cliff sensor is mounted at the inclined part of the suction unit, so that when a step or cliff that is rapidly lowered exists at the front, a proper avoidance operation can be performed by sensing the step or cliff in advance.

Also, the cover case part of the suction unit is configured to open/close the opening of the main case part, so that the brush roller built in the main case part can be withdrawn to the outside. Thus, the brush roller can be more easily cleaned.

Third, the dust container is fastened to the cleaner body as the dust container cover is fastened to the dust container. On the contrary, the fastening between the dust container and the cleaner body is released as the fastening between the dust container and the dust container cover is released, so that the dust container is in a state in which it is separable from the cleaner body. Thus, the assembly convenience of the components can be improved.

In addition, the accommodation part that is provided to cover an upper portion of each of the infrared receiving units and has an opened front to receive infrared light is provided in the middle frame of the dust container cover, so that it is possible to prevent a malfunction of the infrared receiving unit, caused by a three-wavelength lamp provided on a ceiling or sunlight. In addition, the side surface of the dust container cover is provided to protrude further than the top surface of the cleaner body, so that the receiving performance of the infrared receiving unit can be improved.

Fourth, the filter case is hinge-coupled to the cleaner body to open/close the opening formed in the inner wall of the dust container accommodation part. Thus, the filter case is provided in the dust container accommodation part in a state in which the filter case is rotated to open the opening, and the filter accommodation part is exposed to the outside, so that the filter can be easily replaced.

This application relates to U.S. application Ser. No. 15/599,783, U.S. application Ser. No. 15/599,786, U.S. application Ser. No. 15/599,800, U.S. application Ser. No. 15/599,804, U.S. application Ser. No. 15/599,804, U.S. application Ser. No. 15/599,862, U.S. application Ser. No. 15/599,863, U.S. application Ser. No. 15/599,870, and U.S. application Ser. No. 15/599,894, all filed on May 19, 2017, which are hereby incorporated by reference in their entirety. Further, one of ordinary skill in the art will recognize that features disclosed in these above-noted applications may be combined in any combination with features disclosed herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An autonomous cleaner comprising:
a controller to control an operation of the autonomous cleaner;
a cleaner body having a dust container dock formed as a recess, the recess being opened toward a top and rear of the cleaner body;
a plurality of wheels installed at the cleaner body and controlled by the controller;
a cleaner head attached to the cleaner body;
a dust container provided in the recess of the cleaner body, the dust container collecting foreign substances filtered from air suctioned through the cleaner head; and
a cover movable between an open position to reveal a top surface to the dust container and a close position to cover the top surface of the dust container,
wherein the cover is configured to apply a load against a bolt of a lock provided at the dust container and the bolt is configured to move into a bolt receptacle provided at a wall of the recess when the cover is in the closed position.

2. The autonomous cleaner of claim 1, wherein the top surface of the dust container includes a top recess having a side hole, and the bolt is movable in the top recess to protrude through the side hole in a lateral direction by the load for insertion into the bolt receptacle.

3. The autonomous cleaner of claim 2, wherein a projection protrudes from a rear surface of the cover, and is inserted into the top recess to force the bolt to protrude through the side hole when the cover is moved to the closed position.

4. The autonomous cleaner of claim 3, wherein a surface of the projection contacting the bolt is tapered to slide the bolt through the side hole when the cover is closed to cover the top surface of the dust container.

5. The autonomous cleaner of claim 2, wherein the bolt is spring loaded such that when there is an absence of the load in the open position of the cover, the bolt is retracted into the side hole of the top recess, and the dust container is removable from the dust container dock.

6. The autonomous cleaner of claim 5, wherein a hinge couples the cover to the cleaner body and the hinge is spring loaded such that cover returns to the open position, where the cover is upwardly inclined upon release of the cover from the closed position.

7. The autonomous cleaner of claim 6, wherein at least one of an acceleration sensor or a gyro sensor in the cover is used by the controller to determine the open or closed position of the cover to pause or stop the driving of the at least one wheel upon detection that the cover has been opened.

8. The autonomous cleaner of claim 1, wherein the dust container includes:
- a handle recess formed in the top surface of the dust container;
- a handle hinge-coupled to the handle recess to be rotatable, the handle being configured to fit into the handle recess; and
- an elastic spring to return the handle to protrude at an inclined angle relative to the top surface when the cover moves to the open position.

9. The autonomous cleaner of claim 8, wherein the dust container cover is provided with a hook configured to be fastened to a lock of the dust container, and when the hook is fastened to the lock, the elastic spring is forced by the cover to allow the handle to fit into the handle recess.

10. The autonomous cleaner of claim 1, wherein the dust container is formed in a cylindrical shape, and the dust container dock has a rounded shape corresponding to the dust container, and wherein a fixing projection provided to cover at least one portion of an inner wall of the dust container dock is formed to protrude from both sides of the dust container.

11. The autonomous cleaner of claim 1, wherein a portion of the dust container and a portion of the cover are provided to protrude from the rear of the cleaner body.

12. The autonomous cleaner of claim 1, wherein a first cyclone and a second cyclone are provided in the dust container, the first cyclone filtering dust from sucked air, and the second cyclone provided in the first cyclone filtering fine dust.

13. The autonomous cleaner of claim 12, wherein the entire second cyclone is provided in the first cyclone.

14. The autonomous cleaner of claim 12, wherein a filter filtering foreign substances or dust in air that passes through the second cyclone and is then discharged toward an exit is further provided in the dust container.

15. The autonomous cleaner of claim 1, wherein the bolt has a rectangular shape.

16. An autonomous cleaner comprising:
- a controller to control an operation of the autonomous cleaner;
- a cleaner body having a dust container dock formed as a recess, the recess being opened toward a top and rear of the cleaner body;
- a plurality of wheels installed at the cleaner body and controlled by the controller;
- a cleaner head attached to the cleaner body;
- a dust container provided in the recess of the cleaner body, the dust container collecting foreign substances filtered from air suctioned through the cleaner head; and
- a cover movable between an open position to reveal a top surface to the dust container and a close position to cover the top surface of the dust container,
- wherein in a closed position of the cover, the cover is interlocked with the dust container, and the dust container is interlocked with the cleaner body, and
- wherein, when the cover is interlocked with the dust container, a projection of the cover forces a bolt provided in the dust container to move to a lock position into the cleaner body.

17. The autonomous cleaner of claim 16, wherein the top surface of the dust container includes a top recess having a side hole, and the bolt is movable in the top recess to protrude through the side hole in a lateral direction by a load for insertion into a bolt receptacle provided at a wall of the recess.

18. The autonomous cleaner of claim 17, wherein the bolt is spring loaded such that when there is an absence of the load in the open position of the cover, the bolt is retracted into the side hole of the top recess, and the dust container is removable from the dust container dock.

* * * * *